US012288363B2

(12) United States Patent
Sen et al.

(10) Patent No.: US 12,288,363 B2
(45) Date of Patent: Apr. 29, 2025

(54) SENSOR CALIBRATION FOR AUTONOMOUS SYSTEMS AND APPLICATIONS

(71) Applicant: NVIDIA Corporation, Santa Clara, CA (US)

(72) Inventors: Ayon Sen, Santa Clara, CA (US); Gang Pan, Fremont, CA (US); Cheng-Chieh Yang, Seattle, WA (US); Yue Wu, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 51 days.

(21) Appl. No.: 18/166,118

(22) Filed: Feb. 8, 2023

(65) Prior Publication Data

US 2024/0161341 A1    May 16, 2024

Related U.S. Application Data

(60) Provisional application No. 63/425,927, filed on Nov. 16, 2022.

(51) Int. Cl.
*G06T 7/80* (2017.01)
*G01S 17/86* (2020.01)
(Continued)

(52) U.S. Cl.
CPC ............. *G06T 7/80* (2017.01); *G01S 17/86* (2020.01); *G01S 17/89* (2013.01); *G01S 17/931* (2020.01);
(Continued)

(58) Field of Classification Search
CPC ............. G06T 7/80; G06T 2207/10028; G06T 2207/20081; G06T 2207/20084;
(Continued)

(56) References Cited

U.S. PATENT DOCUMENTS 10,859,684 B1    12/2020  Nabatchian
10,897,575 B2     1/2021  Wheeler et al.
(Continued)

OTHER PUBLICATIONS

Sen, Ayon; Non-Final Office Action for U.S. Appl. No. 18/166,121, filed Feb. 8, 2023, mailed Feb. 27, 2025, 19 pgs.

*Primary Examiner* — Michael E Teitelbaum
(74) *Attorney, Agent, or Firm* — Taylor English Duma L.L.P.

(57) ABSTRACT

In various examples, sensor configuration for autonomous or semi-autonomous systems and applications is described. Systems and methods are disclosed that may use image feature correspondences between camera images along with an assumption that image features are locally planar to determine parameters for calibrating an image sensor with a LiDAR sensor and/or another image sensor. In some examples, an optimization problem is constructed that attempts to minimize a geometric loss function, where the geometric loss function encodes the notion that corresponding image features are views of a same point on a locally planar surface (e.g., a surfel or mesh) that is constructed from LiDAR data generated using a LiDAR sensor. In some examples, performing such processes to determine the calibration parameters may remove structure estimation from the optimization problem.

20 Claims, 19 Drawing Sheets

(51) Int. Cl.
 *G01S 17/89* (2020.01)
 *G01S 17/931* (2020.01)
 *H04N 17/00* (2006.01)

(52) U.S. Cl.
 CPC . *H04N 17/002* (2013.01); *G06T 2207/10028* (2013.01); *G06T 2207/20081* (2013.01); *G06T 2207/20084* (2013.01); *G06T 2207/30244* (2013.01)

(58) Field of Classification Search
 CPC ........... G06T 2207/30244; G01S 17/86; G01S 17/89; G01S 17/931; G01S 7/497; G01S 7/4972; H04N 17/002
 See application file for complete search history.

(56) References Cited

U.S. PATENT DOCUMENTS

| | | |
|---|---|---|
| 11,238,615 B2 | 2/2022 | Kroeger |
| 11,482,008 B2 | 10/2022 | Huang et al. |
| 2018/0165833 A1* | 6/2018 | Inoue .................... H04N 17/002 |
| 2020/0005489 A1* | 1/2020 | Kroeger .................... G06T 7/85 |
| 2020/0174107 A1 | 6/2020 | Briggs et al. |
| 2021/0003712 A1 | 1/2021 | Zhang et al. |
| 2022/0404460 A1 | 12/2022 | Liu et al. |
| 2023/0237701 A1 | 7/2023 | Muhassin et al. |
| 2024/0161342 A1 | 5/2024 | Sen et al. |
| 2024/0230866 A1 | 7/2024 | Ma et al. |

\* cited by examiner

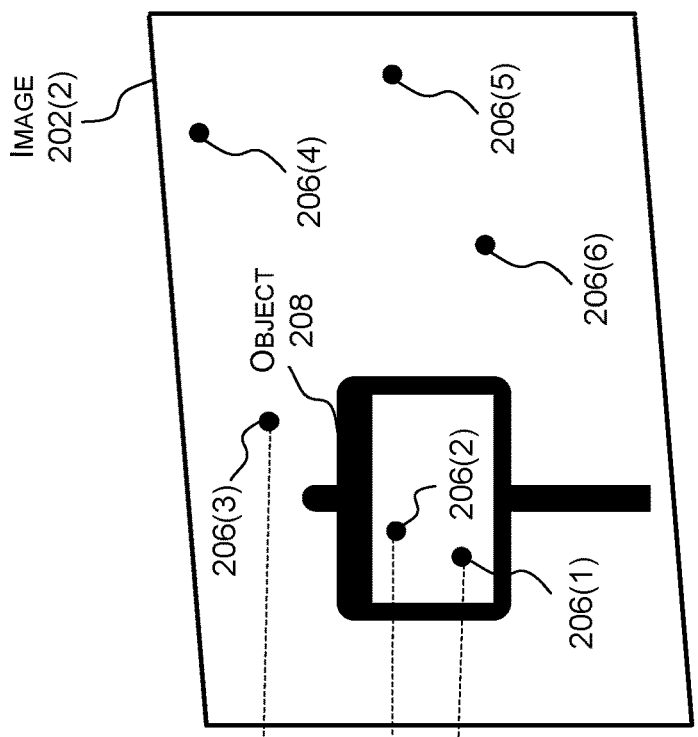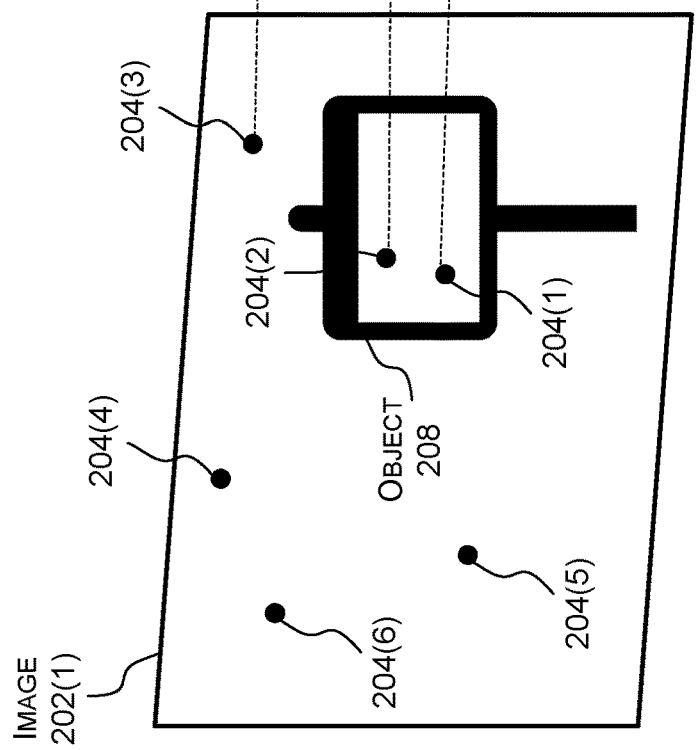
FIGURE 2

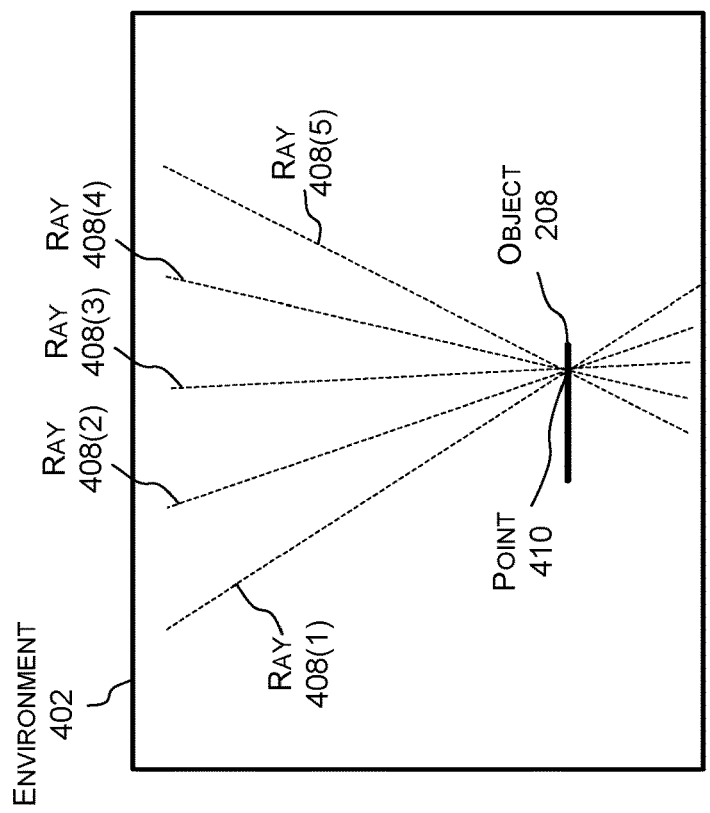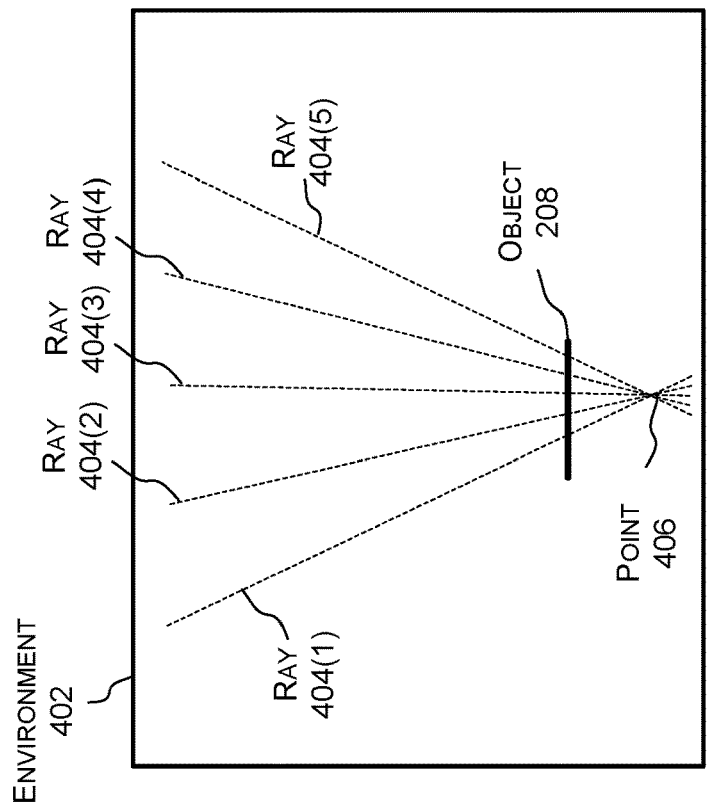
FIGURE 4

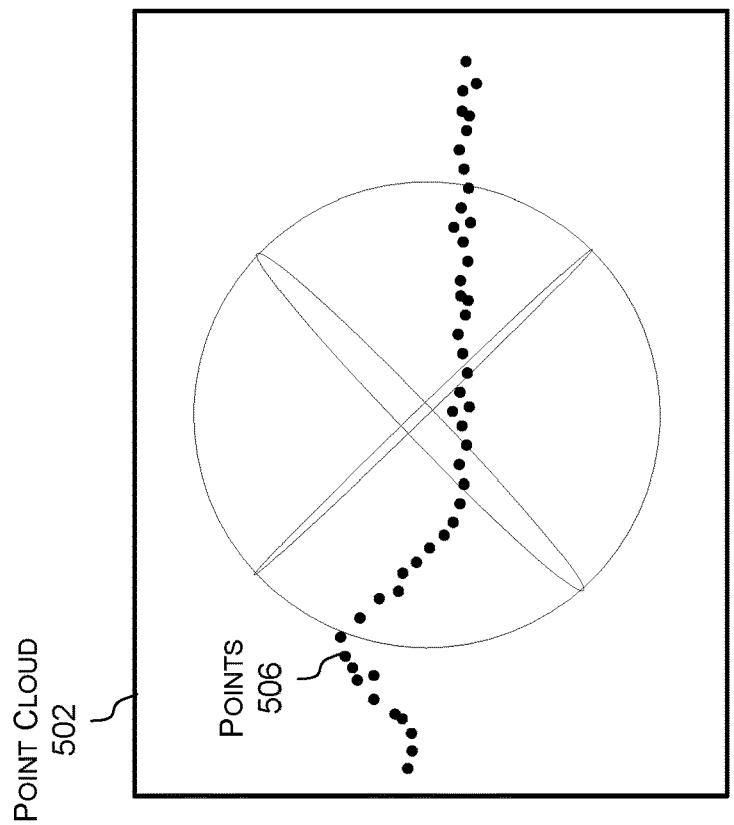
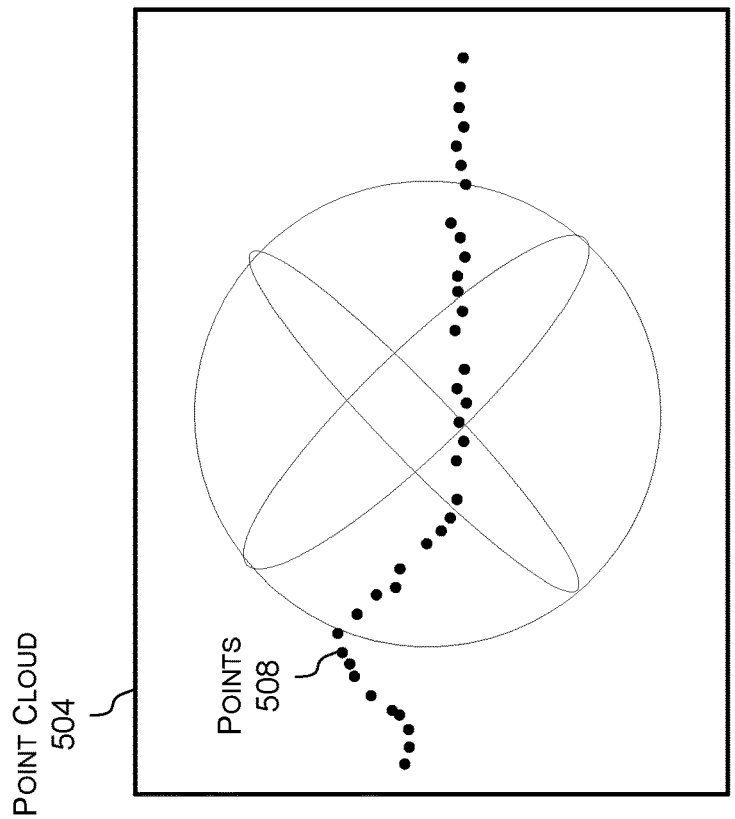
FIGURE 5

800

GENERATE, BASED AT LEAST ON LIDAR DATA GENERATED BY A LIDAR SENSOR OF A MACHINE, A POINT CLOUD
B802

DETERMINE, BASED AT LEAST ON IMAGE DATA GENERATED BY AN IMAGE SENSOR OF THE MACHINE, THAT A FIRST POINT OF A FIRST IMAGE TRACKS TO A SECOND POINT OF A SECOND IMAGE
B804

DETERMINE THAT THE FIRST POINT OF THE FIRST IMAGE AND A THIRD POINT OF THE SECOND IMAGE CORRESPOND TO A FOURTH POINT OF THE POINT CLOUD
B806

DETERMINE, BASED AT LEAST ON THE SECOND POINT OF THE SECOND IMAGE AND THE THIRD POINT OF THE SECOND IMAGE, ONE OR MORE PARAMETERS FOR CALIBRATING THE IMAGE SENSOR WITH RESPECT TO THE LIDAR SENSOR
B808

DETERMINE THAT A FIRST POINT OF A FIRST IMAGE REPRESENTED BY FIRST IMAGE DATA GENERATED BY A FIRST IMAGE SENSOR OF A MACHINE TRACKS TO A SECOND POINT OF A SECOND IMAGE REPRESENTED BY SECOND IMAGE DATA GENERATED BY A SECOND IMAGE SENSOR OF THE MACHINE
B902

GENERATE, BASED AT LEAST ON LIDAR DATA GENERATED BY A LIDAR SENSOR OF THE MACHINE, A POINT CLOUD
B904

DETERMINE THAT THE FIRST POINT OF THE FIRST IMAGE AND A THIRD POINT OF THE SECOND IMAGE CORRESPOND TO A FOURTH POINT OF THE POINT CLOUD
B906

DETERMINE, BASED AT LEAST ON THE SECOND POINT OF THE SECOND IMAGE AND THE THIRD POINT OF THE SECOND IMAGE, ONE OR MORE PARAMETERS FOR CALIBRATING THE FIRST IMAGE SENSOR WITH RESPECT TO THE SECOND IMAGE SENSOR
B908

DETERMINE ONE OR MORE FIRST PARAMETERS FOR CALIBRATING A FIRST IMAGE SENSOR OF A MACHINE WITH RESPECT TO A LIDAR SENSOR OF THE MACHINE AND ONE OR MORE SECOND PARAMETERS FOR CALIBRATING A SECOND IMAGE SENSOR OF THE MACHINE WITH RESPECT TO THE LIDAR SENSOR
B1002

GENERATE, BASED AT LEAST ON THE ONE OR MORE FIRST PARAMETERS AND FIRST IMAGE DATA GENERATED BY THE FIRST IMAGE SENSOR, A FIRST POINT CLOUD
B1004

GENERATE, BASED AT LEAST ON THE ONE OR MORE SECOND PARAMETERS AND SECOND IMAGE DATA GENERATED BY THE SECOND IMAGE SENSOR, A SECOND POINT CLOUD
B1006

DETERMINE, BASED AT LEAST ON THE FIRST POINT CLOUD AND THE SECOND POINT CLOUD, ONE OR MORE THIRD PARAMETERS FOR CALIBRATING THE FIRST IMAGE SENSOR WITH RESPECT TO THE SECOND IMAGE SENSOR
B1008

FIGURE 10

SENSOR CALIBRATION FOR AUTONOMOUS SYSTEMS AND APPLICATIONS

CROSS-REFERENCE TO RELATED APPLICATIONS

This application claims the benefit of U.S. Provisional Application No. 63/425,927, filed on Nov. 16, 2022, which is hereby incorporated by reference in its entirety.

BACKGROUND

Autonomous or semi-autonomous vehicles often incorporate many sensors of varying sensor modalities in order to obtain sufficient coverage of environments surrounding the vehicles. For instance, an autonomous or semi-autonomous vehicle may include an array of cameras with various fields-of-view to capture visual information of an environment surrounding the vehicle, one or more LiDAR or RADAR sensors to measure three-dimensional (3D) information associated with the environment, and/or the like. In some circumstances, sensor fusion may be used to fuse sensor data generated using different sensors—which may be accomplished by registering the sensors to a same coordinate system. For instance, the information may be fused in order to provide a consistent and more robust view of the environment surrounding the vehicle. As such, multiple methods have been established for fusing such information.

For instance, correspondence-based methods attempt to find calibration parameters that attempt to maximize the alignment between features that have a detectable signal in both camera images and LiDAR point clouds. Some common approaches for these correspondence-based methods extract straight lines and/or edge features from the images and assume that they correspond to sharp discontinuities in the LiDAR depth. Other common approaches for these correspondence-based methods directly compare photometric information from cameras and LiDAR sensors, such as by correlating intensity information from the LiDAR sensors to intensity information associated with pixels of the camera images. Still, other approaches for these correspondence-based methods determine objects' classes represented by the camera images and the LiDAR point clouds and then use the objects' classes to correspond the objects together.

However, since correspondence-based methods attempt to find features in two different sensor modalities (e.g., cameras and LiDAR sensors), it may be challenging to obtain accurate correspondences reliably. For instance, while straight line features may be prevalent in many environments, there is no guarantee that the same straight line edges are captured by both the cameras and the LiDAR sensors. Additionally, photometric matching across sensor domains may require the presence of LiDAR intensity information that many LiDAR sensors may not capture and/or may not capture accurately. Furthermore, the object-based correspondence approaches are restrictive since the object-based correspondence approaches require the use of pretrained detectors for object classes in both the camera images and the LiDAR point clouds.

As such, correspondence-free methods have been developed that do not rely on corresponding information from camera images and LiDAR point clouds when determining calibration parameters. For instance, some methods of registration between camera and LiDAR coordinate systems use an odometry trajectory derived independently from both sensors to determine a coarse alignment by solving a hand-eye calibration problem. For example, typical structure-from-motion algorithms are used to solve for camera odometry and Iterative Closest Point (ICP) is used to solve for LiDAR odometry. While these methods avoid explicit cross-sensor correspondence, these methods do not allow all sensor measurements to be used simultaneously to constrain all calibration parameters. Additionally, these methods, as well as the other methods described above, do not solve for the extrinsic and intrinsic parameters for generic multi-camera configurations without requiring explicit camera-to-LiDAR feature correspondence.

SUMMARY

Embodiments of the present disclosure relate to sensor calibration for autonomous and semi-autonomous systems and applications. Systems and methods are disclosed that may use image feature correspondences between camera images, along with an assumption that image features are locally planar, to determine parameters for calibrating one or more image sensors with one or more LiDAR sensors and/or one or more other image sensors. In some examples, an optimization problem is constructed that attempts to minimize a geometric loss function, where the geometric loss function encodes the notion that corresponding image features are views of a same point on a locally planar surface (e.g., a surfel or mesh) that is constructed from LiDAR data generated using one or more LiDAR sensors. In some examples, performing such processes to determine the calibration parameters may remove structure estimation from the optimization problem.

In contrast to conventional systems, such as conventional systems that perform the correspondence-based methods described above, the current systems, in some embodiments, may not require detecting the same features in both camera images and LiDAR point clouds (e.g., cross-modal correspondences) when determining parameters for calibrating a camera with a LiDAR sensor. Rather, the current systems may use feature correspondences between images from one or more cameras, where detecting feature correspondences between images may be easier to detect and/or more accurate than detecting feature correspondences between images and LiDAR point clouds. Additionally, in contrast to conventional systems, such as conventional systems that perform the correspondence-based methods and/or the correspondence-free methods, the current systems, in some embodiments, are able to determine extrinsic and intrinsic parameters for configuring multiple cameras together without requiring explicit camera-to-LiDAR feature correspondence.

BRIEF DESCRIPTION OF THE DRAWINGS

The present systems and methods for sensor calibration for autonomous and semi-autonomous systems and applications are described in detail below with reference to the attached drawing figures, wherein:

FIG. 2 illustrates an example of tracking feature points between two images, in accordance with some embodiments of the present disclosure;

FIG. 4 illustrates an example of projecting points within an environment using a parameter(s) that calibrates an image sensor with respect to a LiDAR sensor, in accordance with some embodiments of the present disclosure;

FIG. 5 illustrates an example of using point clouds to perform feature point tracking between images generated using two image sensors, in accordance with some embodiments of the present disclosure;

FIG. 8 is a flow diagram showing a method for calibrating an image sensor with respect to a LiDAR sensor, in accordance with some embodiments of the present disclosure;

FIG. 9 is a flow diagram showing a method for calibrating a first image sensor with respect to a second image sensor, in accordance with some embodiments of the present disclosure;

FIG. 10 is a flow diagram showing another method for calibrating a first image sensor with respect to a second image sensor, in accordance with some embodiments of the present disclosure;

DETAILED DESCRIPTION

Figure 1A:
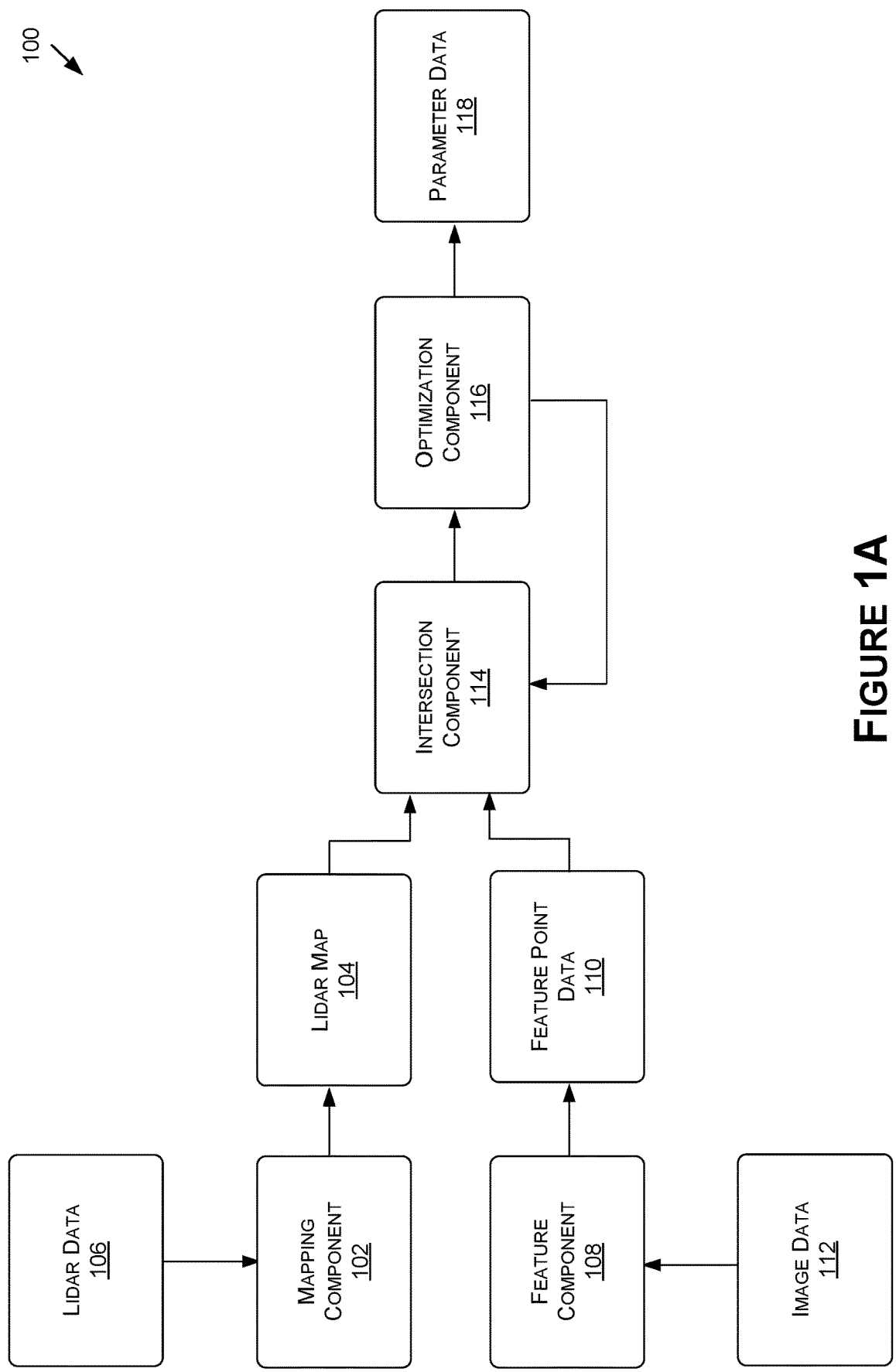
FIG. 1A illustrates an example data flow diagram for a process of calibrating an image sensor with respect to a LiDAR sensor, in accordance with some embodiments of the present disclosure.

Systems and methods are disclosed related to sensor calibration for autonomous and semi-autonomous systems and applications. Although the present disclosure may be described with respect to an example autonomous or semi-autonomous vehicle 1100 (alternatively referred to herein as "vehicle 1100" or "ego-machine 1100," an example of which is described with respect to FIGS. 11A-11D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to sensor configuration, this is not intended to be limiting, and the systems and methods described herein may be used in augmented reality, virtual reality, mixed reality, robotics, security and surveillance, autonomous or semi-autonomous machine applications, and/or any other technology spaces where sensor configuration may be used.

For instance, a system(s) may receive sensor data generated using sensors of a vehicle navigating within an environment, where the sensor data represents at least a portion of the environment surrounding the vehicle. As described herein, the sensor data may include, but is not limited to, image data generated using one or more image sensors (e.g., one or more cameras) of the vehicle, LiDAR data generated using one or more LiDAR sensors of the vehicle, and/or any other type of sensor data. In some examples, at least one of the sensors may include a field-of-view (FOV) that at least partially overlaps with a FOV of at least one other sensor. For example, an image sensor may include a FOV that at least partially overlaps with a FOV of a LiDAR sensor and/or a FOV of another image sensor. In some examples, at least one of the sensors may include FOV that does not overlap with a FOV at least one other sensor. For example, a first image sensor may include a FOV that does not overlap with a FOV of a second image sensor. The system(s) may then use the sensor data to determine one or more parameters (e.g., one or more values for the one or more parameters) for calibrating at least a first sensor with respect to a second sensor.

For example, the system(s) may use image data generated using an image sensor and LiDAR data generated using a LiDAR sensor to determine one or more values one or more parameters for calibrating the image sensor with respect to the LiDAR sensor. To determine the parameter(s), the system(s) may process the LiDAR data in order to generate a point cloud representing three-dimensional (3D) points within the environment. Additionally, the system(s) may process the image data in order to determine, for each image of at least two images, feature points (e.g., a list of feature points) associated with the image along with a timestamp associated with the feature points (e.g., a timestamp of when the image sensor generated the image). The system(s) may then track (e.g., associate, group, etc.) features points between two images. For instance, if a first feature point of a first image generated at a first time depicts a same feature in the environment as a second feature point of a second image generated at a second time, the system(s) may track the first feature point of the first image to the second feature point of the second image.

The system(s) may then use the tracked feature points and the point cloud to determine the parameter(s). For instance, in some examples, the system(s) may use an initial parameter(s) associated with the image sensor to project a first ray from a first feature point of a first image to a point of the point cloud and then project a second ray from the point of the point cloud back to a point (which may be referred to, in some examples, as a "projected point") of a second image. The system(s) may then use the projected point of the second image along with a second feature point of the second image, where the second feature point of the second image is the tracked feature point corresponding to the first feature point of the first image, to determine the parameter(s). For example, the system(s) may determine a distance between the projected point and the second feature point. The system(s) may then use one or more equations to determine the parameter(s) based on the distance. In some examples, the system(s) may perform such a process to determine the parameter(s) since the projected point should align with (e.g., include, be within a threshold distance to, etc.) the second feature point when the parameter(s) is correct (and/or substantially correct).

In some examples, the system(s) may perform these processes to determine multiple distances between projected points and feature points for the same two images and/or for any number of images represented by the image data generated using the image sensor. The system(s) may then use these distances to determine the parameter(s). For a first example, the system(s) may determine the average of the differences and then use the average of the differences to determine the parameter(s). For a second example, the system(s) may determine the minimum, median, mode, and/or maximum of the distances and then use that distance to determine the parameter(s). Additionally, in such examples, the system(s) may filter out one or more of the distances, such as one or more distances that are greater than a threshold distance (e.g., outlier distances) and/or associated with tracked feature points that include confidences that are less than a threshold confidence.

In some examples, the system(s) may then repeat these processes in order continue refining the parameter(s). For example, the system(s) may perform similar processes, but with using the newly determined parameter(s) for projecting the rays, to continue determining new parameter(s) for calibrating the image sensor with respect to the LiDAR sensor. In some examples, the system(s) may continue performing these processes until one or more events occur, such as the difference(s) used for determining the parameter(s) being less than a threshold distance. This is because, as described above, when the parameter(s) is correct (and/or substantially correct), the projected points of the second image should align with the tracked features points of the second image.

While the examples above describe calibrating an image sensor with respect to a LiDAR sensor, in some examples, the system(s) may perform some similar processes to determine one or more parameters for calibrating a first image sensor with respect to a second image sensor. For example, the system(s) may determine one or more first parameters for calibrating the first image sensor with respect to a LiDAR sensor and one or more second parameters for calibrating the second image sensor with respect to the LiDAR sensor. In some examples, the system(s) determines the first parameter(s) and/or the second parameter(s) using the processes above. In other examples, the system(s) determines the first parameter(s) and/or the second parameter(s) using any other calibration process.

The system(s) may then use the first parameter(s) and first image data generated using the first image sensor to generate a first point cloud, where the first point cloud represents 3D points within the environment. Additionally, the system(s) may use the second parameter(s) and second image data generated using the second image sensor to generate a second point cloud, where the second point cloud also represents 3D points within the environment. The system(s) may then use the first point cloud and the second point cloud to track one or more first feature points of a first image represented by the first image data to one or more second feature points of a second image represented by the second image data. As described herein, the system(s) may track the first feature point(s) of the first image to the second feature point(s) of the second image based on the first feature point(s) and the second feature point(s) depicting the same feature(s) within the environment.

In some examples, the system(s) may then use one or more additional processes to refine the feature point tracks. For example, the system(s) may perform cross-camera track association and image space match refinement, which is described in more detail here, to track the feature points from the first image to the second image. The system(s) may then use the feature point tracks to determine the parameter(s). For example, the system(s) may process LiDAR data generated using the LiDAR sensor in order to generate a third point cloud representing 3D points within the environment. The system(s) may then perform similar processes as those described above with regard to the image sensor to LiDAR sensor calibration, using the tracked feature points and the third point cloud, to determine the parameter(s) for calibrating the first image sensor with respect to the second image sensor.

As described herein, the parameter(s) may include one or more translation dimensions and/or one or more rotation dimensions. For example, the one or more translation dimensions may include, but are not limited to, a translation in the x-direction, a translation in the y-direction, and/or a translation in the z-direction. The one or more rotation dimensions may include, but are not limited to, a roll rotation, a yaw rotation, and/or a pitch rotation. Additionally, in some examples, the system(s) may perform one or more processes to determine one or more parameters associated with a lens of an image sensor, where the parameter(s) associated with the lens is further used to calibrate the image sensor with respect to a LiDAR sensor and/or another image sensor.

In some examples, the system(s) performing these processes may be remote from the vehicle. For example, the system(s) may receive the sensor data generated by the sensors of the vehicle and then use the sensor data to perform these processes. The system(s) may then send, to the vehicle, data representing the parameter(s). Additionally, or alternatively, in some examples, the system(s) performing these processes may be included as part of the vehicle. In any of the examples, the system(s) may perform these processes at the elapse of a time interval (e.g., every minute, hour, day, week, month, etc.), when an event occurs (e.g., receive an indication to perform the calibration, a new sensor is installed on the vehicle, etc.), and/or at one or more additional and/or alternative times or time intervals.

The systems and methods described herein may be used by, without limitation, non-autonomous vehicles, semi-autonomous vehicles (e.g., in one or more adaptive driver assistance systems (ADAS)), non-autonomous vehicles, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, sensor calibration, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems for performing sensor calibration, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

FIG. 1A illustrates an example data flow diagram for a process 100 of calibrating an image sensor with respect to a LiDAR sensor, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous or semi-autonomous vehicle 1100 of FIGS. 11A-11D, example computing device 1200 of FIG. 12, and/or example data center 1300 of FIG. 13.

The process 100 may include a mapping component 102 that generates a LiDAR map 104 using LiDAR data 106 generated using a LiDAR sensor of a vehicle. For instance, the LiDAR data 106 may represent one or more LiDAR scans of an environment that is exterior to the vehicle, such as when the vehicle is navigating along the environment. As such, the mapping component 102 may use one or more processes, such as Iterative Closest Point (ICP) alignment and/or any other process, to process the LiDAR data 106 and/or additional sensor data (e.g., motion data) in order to generate the LiDAR map 104, which may include a 3D point cloud. In some examples, the mapping component 102 may further process the LiDAR map 104, such as be removing points that are associated with dynamic objects that are located within the environment and represented by the LiDAR data 106.

In some examples, the mapping component 102 may further split the LiDAR map 104 into portions, such as a first portion that includes ground points and a second portion that includes points other than the ground points. The system(s) may then build a surface mesh for the ground, such as by using Poisson Surface Reconstruction and/or any other technique, and also build surfels for the structures above the ground. In some examples, the ground mesh and structural surfels provide a locally planar surface representation of the scene. For example, the ground mesh and/or the structural surfels may each represent a plane of a given size. In some examples, each of the planes may include a same size while, in other examples, one or more of the planes may include differing sizes.

The process 100 may include a feature component 108 generating feature point data 110 using image data 112 generated using an image sensor (e.g., a camera) of the vehicle. For instance, the image data 112 may represent images captured using the image sensor as the vehicle is navigating around the environment. In some examples, at least a portion of the image data 112 is generated while the vehicle is generating the LiDAR data 106 and/or at least a portion of the image data 112 represents the same environment that is represented by the LiDAR data 106. The feature point data 110 may represent feature points depicted by the images. In some examples, the feature component 108 may use any technique of processing of the image data 112 in order to generate the feature point data 110. The technique(s) may include, but is not limited to, Harris Corner, Scale Invariant Feature Transform (SIFT), Speeded Up Robust Feature (SURF), Features from Accelerated Segment Test (FAST), Oriented FAST and Rotated BRIEF (ORB), and/or any other technique.

In some examples, the feature component 108 may further determine tracks associated with the feature points between the images. For example, and for a first image and a second image, the feature component 108 may track one or more feature points depicted by the first image to the second image, wherein the one or more feature points are associated with one or more 3D world points within the environment. In some examples, the feature component 108 may perform any method to track the feature points, such as the monocular structure—from motion (SfM) method. The feature component 108 may then generate the feature point data 110 to further represent a list of tracked feature points between the first image and the second image. Additionally, in some examples, the feature component 108 may perform these processes to track features points between more than two images represented by the image data 112.

For instance, FIG. 2 illustrates an example of tracking feature points between two images, in accordance with some embodiments of the present disclosure. As shown by the example of FIG. 2, the feature component 108 may analyze image data (e.g., the image data 112) that represents at least a first image 202(1) generated at a first time by an image sensor and a second image 202(2) generated at a second, later time by the image sensor. Based on the analysis, the feature component 108 may initially identify first feature points 204(1)-(6) (also referred to singularly as "feature point 204" or in plural as "feature points 204") associated with the first image 202(1) and second feature points 206(1)-(6) (also referred to singularly as "feature point 206" or in plural as "feature points 206") associated with the second image 202(2). As shown, the feature points 204 and 206 may be associated with an object 208 depicted by the images 202(1)-(2) and/or a background of the images 202(1)-(2). While the example of FIG. 2 illustrates the feature component 108 identifying six feature points 204 and 206 for each image 202(1)-(2), in other examples, the feature component 108 may identify any number of features points for images (e.g., one feature point, ten feature points, one hundred feature points, one thousand feature points, etc.).

The feature component 108 may also track one or more of the feature points 204 from the first image 202(1) to the second image 202(2). For instance, and as shown by the example of FIG. 2, the feature component 108 may track at least the feature points 204(1)-(3) from the first image 202(1) to the second image 202(2), where the feature points 206(1)-(3) correspond to the feature points 204(1)-(3) (which is indicated by the dashed lines connecting the feature points 204(1)-(3) to the feature points 206(1)-(3), respectively). However, the feature component 108 may further determine that the tracks associated with the feature points 204(4)-(6) end since the second image 202(2) does not depict the feature points 204(4)-(6).

In some examples, the feature component 108 may generate feature point data (e.g., the feature point data 110) that represents at least identifiers associated with the feature points 204, locations of the feature points 204 (e.g., pixel locations of the feature points 204), timestamps associated with the feature points 204 (e.g., a time when the first image 202(1) was generated), identifiers associated with the feature points 206, locations of the feature points 206 (e.g., pixel locations of the feature points 206), and timestamps associated with the feature points 206 (e.g., a time when the second image 202(2) was generated). In some examples, the feature component 108 may further generate the feature point data to indicate the feature tracks associated with the feature points 204(1)-(3) and 206(1)-(3).

Referring back to the example of FIG. 1A, the process 100 may include an intersection component 114 that projects points between images using the LiDAR map 104. For instance, in some examples, the intersection component 114 may use initial parameter(s) (e.g., an initial value(s) for the parameter(s)) associated with the image sensor to project a first ray from a feature point of a first image represented by the image data 112 to a point of the LiDAR map 104 and then project a second ray from the point of the LiDAR map 104 back to a point of a second image represented by the image data 112. In some examples, the intersection component 114 may then perform similar processes to project multiple feature points from the first image to the second image. Additionally, in some examples, the intersection component 114 may perform similar processes to project feature points between more than two images represented by the image data 112.

The process 100 may then include an optimization component 116 that uses the feature points and/or the projected points within the images to determine the parameter(s) for calibrating the image sensor with respect to the LiDAR sensor. For instance, and using the example above, the optimization component 116 may use the projected point of the second image and a second feature point of the second image, wherein the second feature point includes a tracked feature point corresponding to the first feature point of first image, to determine the parameter(s). For example, the optimization component 116 may determine a distance between the projected point and the second feature point. The optimization component 116 may then use one or more equations to determine the parameter(s) based on the distance. In some examples, the optimization component 116 may perform such a process to determine the parameter(s) since the projected point should align with (e.g., include, be within a threshold distance to, etc.) the second feature point when the parameter(s) is correct (and/or substantially correct).

In some examples, the optimization component 116 may perform these processes to determine multiple distances between projected points and feature points for the same two images and/or for any number of images represented by the image data 112. The optimization component 116 may then use these distances to determine the parameter(s). For a first example, the optimization component 116 may determine the average of the differences and then use the average of the differences to determine the parameter(s). For a second examples, the optimization component 116 may determine the minimum, median, mode, and/or maximum of the distances and then use that distance to determine the parameter(s). Additionally, in such examples, the optimization component 116 may filter out one or more of the distances, such as one or more distances that are greater than a threshold distance (e.g., outlier distances) and/or one or more distances that are associated with one or more tracked feature points that include a low confidence(s) (e.g., a confidence that is less than a threshold confidence).

In some examples, the intersection component 114 and/or the optimization component 116 may then repeat these processes in order continue refining the parameter(s) (e.g., refining the value(s) for the parameter(s)). For example, the intersection component 114 and/or the optimization component 116 may perform similar processes, but with using the newly determined parameter(s) for projecting the rays, to continue determining new parameter(s) for calibrating the image sensor with respect to the LiDAR sensor. In some examples, the intersection component 114 and/or the optimization component 116 may continue performing these processes until one or more events occur, such as the difference(s) used for determining the parameter(s) being less than a threshold distance. This is because, as described herein, when the parameter(s) is correct (and/or substantially correct), the projected points that are reprojected back to the second image should align with the tracked feature points.

Figure 3A:
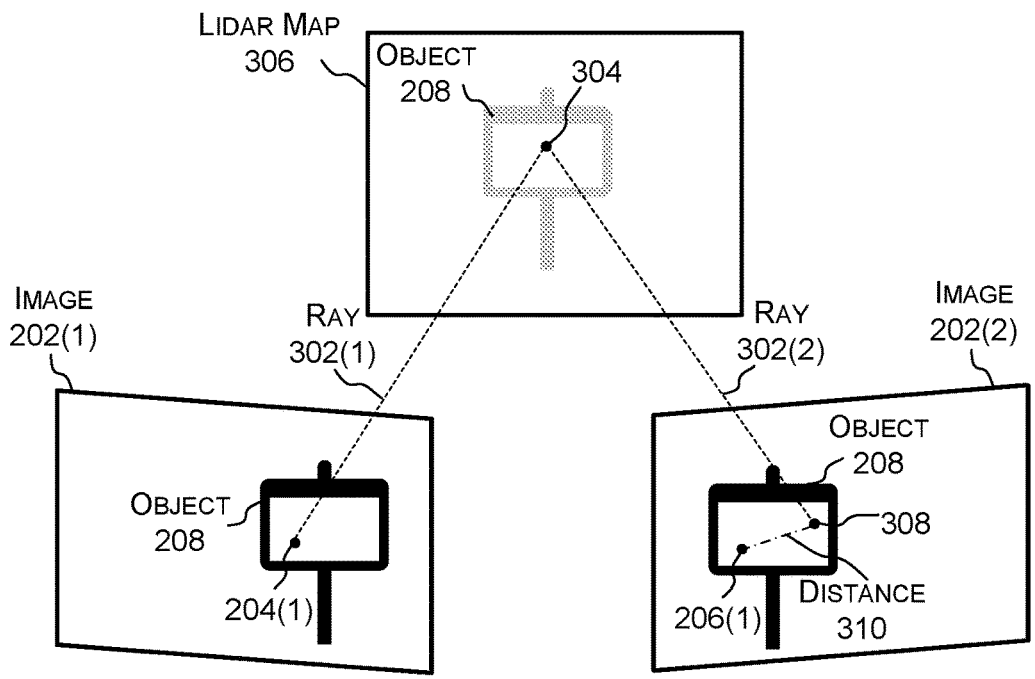
FIGS. 3A-3C illustrate an example of performing an optimization of a parameter(s) for calibrating an image sensor with respect to a LiDAR sensor, in accordance with some embodiments of the present disclosure.
Figure 3B:
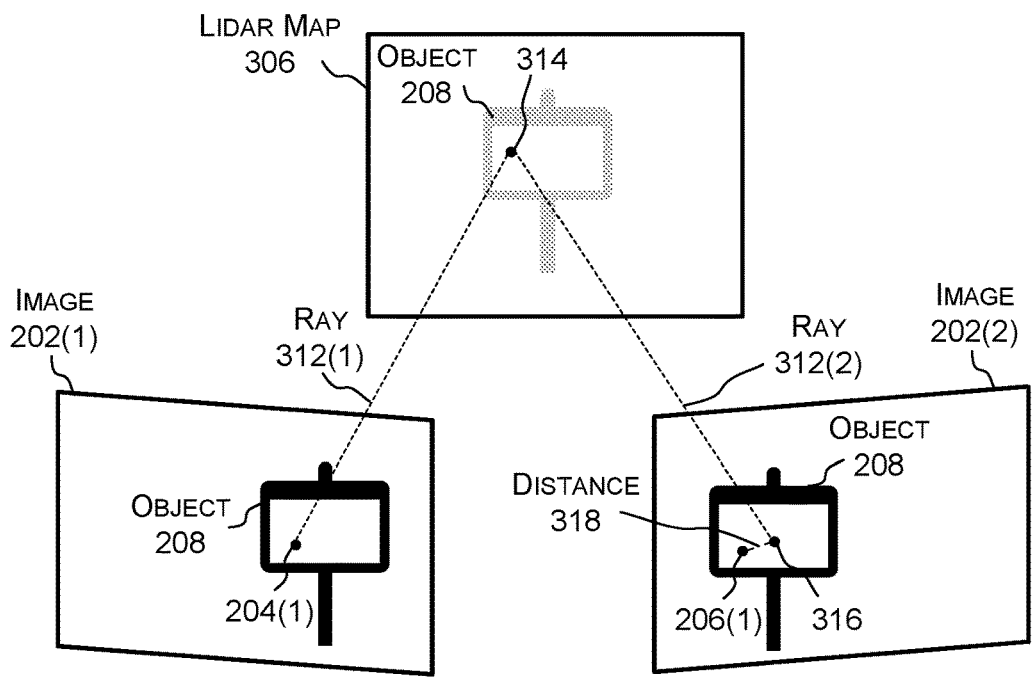
Figure 3C:
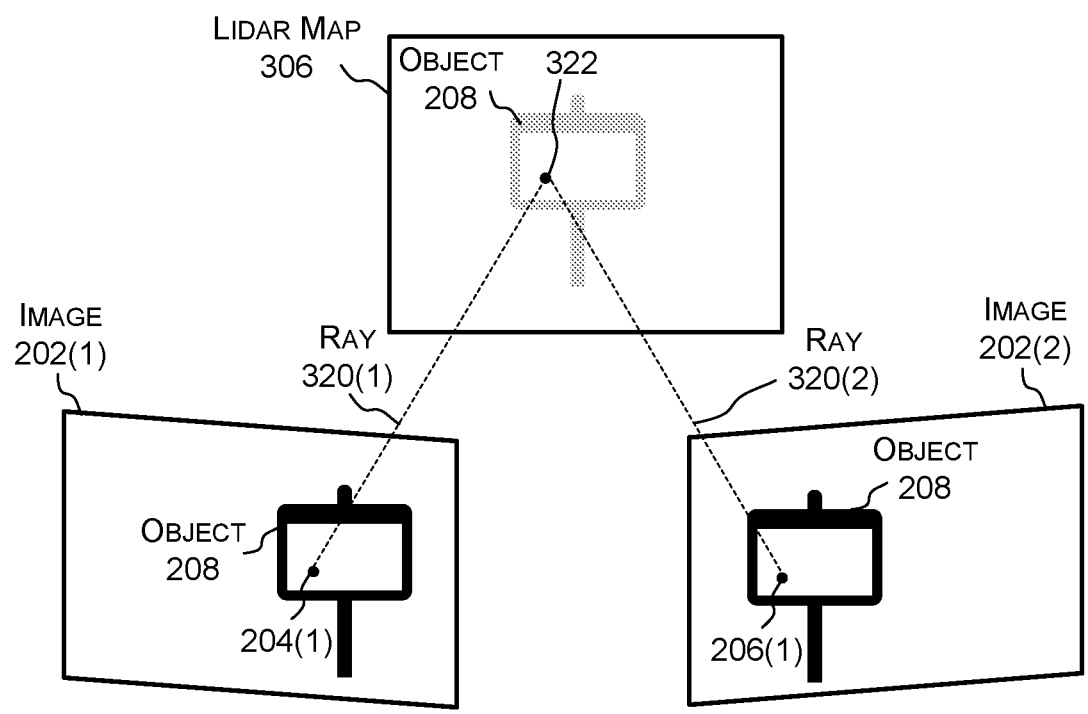

For instance, FIGS. 3A-3C illustrate an example of optimizing a parameter(s) for calibrating an image sensor with respect to a LiDAR sensor, in accordance with some examples of the present disclosure. As shown by the example of FIG. 3A, the intersection component 114 may project a first ray 302(1) from the feature point 204(1) of the first image 202(1) to a point 304 of a LiDAR map 306 created using LiDAR data (e.g., the LiDAR data 106) generated using a LiDAR sensor. In some examples, the intersection component 114 projects the first ray 302(1) from the center of the image sensor using an initial parameter(s) (e.g., a parameter(s) guess) associated with the image sensor. The intersection component 114 may then project a second ray 302(2) from the point 304 of the LiDAR map 306 to a point 308 of the second image 202(2). In some examples, the intersection component 114 projects the second ray 302(2) based on the center of the image sensor and/or using the initial parameter(s). The optimization component 116 may then determine a first calibrated parameter(s) for the image sensor using the point 308 and the feature point 206(1) that includes the tracked feature point from the feature point 204(1). For example, the optimization component 116 may determine a distance 310 between the point 308 and the feature point 206(1). The optimization component 116 may then determine the first calibrated parameter(s) based at least on the distance 310.

While the example of FIG. 3A only illustrates projecting one feature point 204(1) from the first image 202(1) to the second image 202(2), in other examples, the intersection component 114 may perform similar processes to project multiple feature points (e.g., the feature points 202(2)-(3))

from the first image 202(1) to the second image 202(2). The optimization component 116 may then determine differences associated with multiple projected points and features points (e.g., the feature points 206(2)-(3)) associated with the second image 202(2). Additionally, while the example of FIG. 3A only illustrates projecting feature points between two images 202(1)-(2), in other examples, the intersection component 114 may perform similar processes to project feature points between multiple other images represented by the image data 112. The optimization component 116 may then determine differences associated with multiple projected points and features points associated with the multiple images. In any of these examples, the optimization component 116 may then use one or more of the processes described herein to determine the first calibrated parameter (s) using the differences.

The intersection component 114 and/or the optimization component 116 may then continue to perform these processes to refine the calibrated parameter(s). For instance, and shown by the example of FIG. 3B, the intersection component 114 may project a first ray 312(1) from the feature point 204(1) of the first image 202(1) to a point 314 of the LiDAR map 306. In some examples, the intersection component 114 projects the first ray 312(1) from the center of the image sensor using the first calibrated parameter(s) (e.g., determined in the example of FIG. 3A) associated with the image sensor. The intersection component 114 may then project a second ray 312(2) from the point 314 of the LiDAR map 306 to a point 316 of the second image 202(2). In some examples, the intersection component 114 projects the second ray 312(2) based on the center of the image sensor and/or using the first calibrated parameter(s). The optimization component 116 may then determine a second calibrated parameter(s) for the image sensor using the point 316 and the feature point 206(1). For example, the optimization component 116 may determine a distance 318 between the point 316 and the feature point 206(1). The optimization component 116 may then determine the second calibrated parameter(s) based at least on the distance 318 (and/or multiple distances, using the processes described herein).

As shown by the examples of FIGS. 3A-3B, the distance 318 associated with the second optimization process that is performed is less than the distance 310 associated with the first optimization process. This may be because the first calibrated parameter(s) that was used to project the rays 312(1)-(2) was more accurate than the initial parameter(s) that was used to project the rays 302(1)-(2). In other words, each time the optimization component 116 performs a new optimization process using updated calibrated parameter(s) determined during the previous optimization process, the optimization component 116 determines a parameter(s) that is closer to the actual parameter(s) that will calibrate the image sensor with respect to the LiDAR sensor. As such, and in some examples, the intersection component 114 and/or the optimization component 116 may continue to perform these processes until one or more events occur.

For instance, and as shown by the example of FIG. 3C, the intersection component 114 may project a first ray 320(1) from the feature point 204(1) of the first image 202(1) to a point 322 of the LiDAR map 306. In some examples, the intersection component 114 projects the first ray 320(1) from the center of the image sensor using the second calibrated parameter(s) (e.g., determined in the example of FIG. 3B) associated with the image sensor. The intersection component 114 may then project a second ray 320(2) from the point 322 of the LiDAR map 306 to a point of the second image 202(2). In some examples, the intersection component 114 projects the second ray 320(2) based on the center of the image sensor and/or using the second calibrated parameter(s). As shown by the example of FIG. 3C, the projected point of the second image 202(2) includes the feature point 206(1). As such, the optimization component 116 may determine that the second calibrated parameter(s) includes the actual parameter(s) that calibrated the image sensor with respect to the LiDAR sensor.

While the example of FIG. 3A-3C describe the calibration process as ending when the projected point includes the feature point 206(1), in other examples, the calibration process may end when one or more additional and/or alternative events occur. For a first example, the intersection component 114 and/or the optimization component 116 may continue to perform these processes until one or more of the projected points are within a threshold distance to one or more corresponding tracked feature points. For a second example, the intersection component 114 and/or the optimization component 116 may continue to perform these processes a threshold number of time. The threshold number of times may include, but is not limited to, one time, two times, five times, ten times, and/or any other number of times.

In some examples, the more accurate the parameter(s) are for calibrating the image sensor with respect to the LiDAR sensor, the closer the projected points are to the actual points in the LiDAR map 306. For instance, FIG. 4 illustrates an example of projecting points within an environment using a parameter(s) that calibrates an image sensor with respect to a LiDAR sensor, in accordance with some embodiments of the present disclosure. As shown, at a first time that is represented by the left illustration of an environment 402, the intersection component 114 may project rays 404(1)-(5) (also referred to singularly as "ray 404" or in plural as "rays 404") using images captured by the image sensor and a first parameter(s) (e.g., the initial parameter(s) in the example of FIGS. 3A-3C). For instance, the intersection component 114 may project the ray 404(1) from a tracked feature point of a first image using the first parameter(s) for the image sensor, project the ray 404(2) using the tracked feature point of a second image using the first parameter(s) of the image sensor, and/or so forth.

In the example of FIG. 4, the rays 404 should all converge at a point on the object 208 based on the tracked feature point including a point on the object 208 depicted by the images. However, at the first time, the rays 404 converge at a point 406 that is located behind the object 208. In some examples, the rays 404 may converge at the point 406 based on the first parameter(s) for the image sensor not accurately calibrating the image sensor with respect to the LiDAR sensor.

For instance, at a second time that is represented by the right illustration of the environment 402, the intersection component 114 may again project rays 408(1)-(5) (also referred to singularly as "ray 408" or in plural as "rays 408") using the same images captured by the image sensor, but with a second parameter(s) (e.g., the second parameter(s) from the example of FIGS. 3A-3C). For instance, the intersection component 114 may project the ray 408(1) from the tracked feature point of the first image using the second parameter(s) for the image sensor, project the ray 408(2) using the tracked feature point of the second image using the second parameter(s) of the image sensor, and/or so forth. In the example of FIG. 4, since the second parameter(s) includes the actual parameter(s) that calibrate the image senor with respect to the LiDAR sensor, the rays 408 converge at the correct point on the object 208.

Referring back to the example of FIG. 1A, in some examples, the system(s) (e.g., the intersection component 114, the optimization component 116, etc.) may use one or more equations to perform one or more of the processes described herein. For instance, the system(s) may let $u_{i,t_1}$ be an image pixel (e.g., a feature point) in the ith image with a timestamp $t_1$, and $u_{j,t_2}$ be an image pixel (e.g., a feature point) in the jth image with a timestamp $t_2$. As such, if $u_{i,t_1}$ and $u_{j,t_2}$ are different views of the same point in the environment, then their back-projected image rays should intersect at that point on a locally planar surface. However, in the case where there is a misalignment, the spread of ray-to-plane intersection points quantifies the degree of misalignment. This metric may be expressed in image space to control the effect of the distance.

For instance, let $\Pi_i$ represent the function that projects the centered 3D point of the image sensor to its image pixel for the ith image sensor, which is a function of the image sensor's intrinsic parameters. Also, let $T_i^L$ represent the SE(3) pose that transforms the centered coordinate system of the image sensor for the ith image sensor to the LiDAR-centered coordinate system L. Similarly, let $T_L^W(t)$ represent the SE(3) pose that transforms L at timestamp t into the map coordinate system W. Finally, let the normal and position $(n^W, p^W)$ parameterize a specific plane in the map coordinate system.

The operation transforms the image ray into map coordinates via $T_L^W(t_1)T_i^L$ and finds the point of intersection $x^W$ (e.g., the point 304, the point 314, the point 322, etc.) with the plane $(n^W, p^W)$. As such, the following equations may be used:

$$x^W = \Gamma(\Pi_i^{-1}(u_{i,t_1}), T_L^W(t_1)T_i^L, m^W, p^W) \quad (1)$$

$$e_{i,j,t_1,t_2} = \|\Pi_j((T_L^W(t_2)T_j^L)^{-1}x^W) - u_{j,t_2}\|^2 \quad (2)$$

$$e = \Sigma_{i,j,t_1,t_2} e_{i,j,t_1,t_2} \quad (3)$$

In equations (1)-(3), the unknowns may include the N image sensor to camera poses and the intrinsic parameters $\{(T_i^L, \Pi_i)\}_{i=1}^N$ of the image sensor. This may be because $T_L^W(t)$ is known from the LiDAR trajectory obtained in the LiDAR mapping. In some examples, since it may be assumed that the association of the plane with the image ray is known a priori, then the operation is differentiable. As such, this formulation allows refinement of the unknowns while constraining the structure points to the mesh surface, but without prescribing their 3D positions. It also may make no distinction between whether the pixel correspondences come from the same image sensor or not.

Since the plane normal for the feature points may be known in the loss function, the plane normal for the feature points are derived from the planar surface element that the back-projected image rays intersect with. As described herein, this process may be performed using initial estimates of the image sensor to LiDAR poses and the image sensor intrinsic parameters such that the accuracy of this association depends on how poor those initial estimates are, but also on how large the planar surface elements are. In a typical outdoor scene, there are features of many scales. For example, the road surface may include a very coarse mesh, but foliage on trees may manifest as a collection of very small surfels with very different normal directions. To utilize the information present at multiple scales, the system(s) may progressively build a set of tracks associated with large-to-small feature scales while performing a coarse-to-fine refinement of the calibration parameters and the intersection points.

In the example of FIG. 1A, the process 100 may include outputting parameter data 118 associated with the optimization. For instance, and as described herein, the parameter(s) represented by the parameter data 118 may include one or more translation dimensions and/or one or more rotation dimensions. For example, the one or more translation dimensions may include, but are not limited to, a translation in the x-direction, a translation in the y-direction, and/or a translation in the z-direction. The one or more rotation dimensions may include, but are not limited to, a roll rotation, a yaw rotation, and/or a pitch rotation. In some examples, the system(s) may repeat the process 100 to calibrate more than one image sensor with the LiDAR sensor and/or calibrate the image sensor with more than one LiDAR sensor.

Figure 1B:
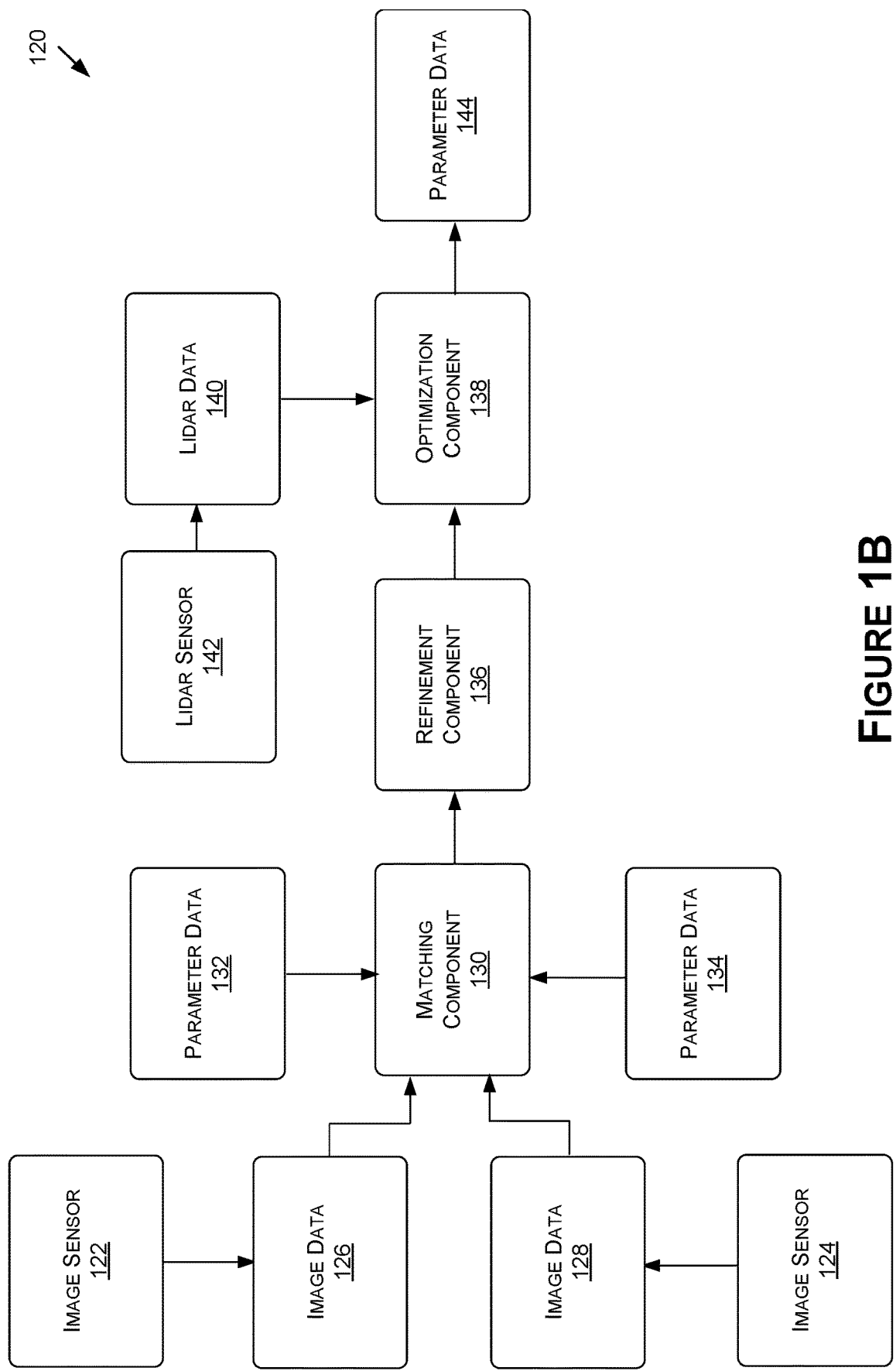
FIG. 1B illustrates an example data flow diagram for a process of calibrating a first image sensor with respect to a second image sensor, in accordance with some embodiments of the present disclosure.

As described herein, in some examples, the system(s) may be able to determine a parameter(s) for calibrating a first image sensor with respect to a second image sensor. For instance, FIG. 1B illustrates an example data flow diagram for a process 120 of calibrating a first image sensor 122 with respect to a second image sensor 124, in accordance with some embodiments of the present disclosure. As shown, the process 120 may include the first image sensor 122 generating first image data 126 representing one or more images depicting an environment and the second image sensor 124 generating second image data 128 representing one or more images depicting the environment. In some examples, a FOV of the first image sensor 122 at least partially overlaps with a FOV of the second image sensor 124. In other examples, the FOV of the first image sensor 122 may not overlap with the FOV of the second image sensor 124.

The process 120 may include a matching component 130 that performs one or more processes to track one or more feature points from at least a first image represented by the first image data 126 to at least a second image represented by the second image data 128. For instance, the matching component 130 may receive the first image data 126 generated by the first image sensor 122 and the second image data 128 generated by the second image sensor 124. The matching component 130 may then perform one or more processes (e.g., the one or more processes of the feature component 108) to identify first feature points associated with the first image represented by the first image data 126 and second feature points associated with the second image represented by the second image data 128.

The matching component 130 may also receive first parameter data 132 that represents one or more first parameters for calibrating the first image sensor 122 with a LiDAR sensor and second parameter data 134 that represents one or more second parameters for calibrating the second image sensor 124 with the same LiDAR sensor. In some examples, the first parameter data 132 and/or the second parameter data 134 are generated using the process 100 of FIG. 1A (e.g., the first parameter data 132 and/or the second parameter data 134 include parameter data 118). In some examples, the first parameter data 132 and/or the second parameter data 134 are generated using one or more additional and/or alternative processes for calibrating image sensors with a LiDAR sensors.

The matching component 130 may then be configured to generate a first point cloud using the first image data 126 and the first parameter data 132 and a second point cloud using the second image data 128 and the second parameter data 134. For example, the matching component 130 may perform the processes described herein to project feature points of the first image represented by the first image data 126 using the first parameter data 132 in order to identify 3D points within the environment (e.g., the $x^W$ points described above), where the 3D points are included in the first point cloud. The matching component 130 may also perform the processes described herein to project feature points of the second image represented by the second image data 128 using the second parameter data 134 in order to identify 3D points within the environment (e.g., the $x^W$ points described above), where the 3D points are included in the second point cloud. Using the first point cloud and the second point cloud, the matching component 130 may track one or more of the feature points from the first image to the second image.

For instance, and in some examples, the matching component 130 may perform a nearest-neighbor search using the first point cloud and the second point cloud. Performing the nearest-neighbor search may indicate which feature points from the first image are likely the same feature points in the second image.

For instance, FIG. 5 illustrates an example of using point clouds to perform feature point tracking between images generated by two image sensors, in accordance with some examples of the present disclosure. In the example of FIG. 5, the matching component 130 may generate a first point cloud 502 using the first image data 126 and the first parameter data 132. The matching component 130 may also generate a second point cloud 504 using the second image data 128 and the second parameter data 134. The matching component 130 may then perform a nearest-neighbor match to track one or more points 506 (although only one is labeled for clarity reasons) of the first point cloud 502 to one or more points 508 (although only one is labeled for clarity reasons) of the second point cloud 504. In some examples, the matching component 130 uses a small search radius between the first point cloud 502 and the second point cloud 504 in order to identify the nearest-neighbor matches.

In the example of FIG. 5, the points 506 of the first point cloud 502 are similar to the points 508 of the second point cloud 504. This is because the points 506 of the first point cloud 502 and the points 508 of the second point cloud 504 represent the same points in the 3D environment. As such, by performing the nearest-neighbor match, the matching component 130 may be configured to track multiple feature points from the first image represented by the first image data 126 to the second image represented by the second image data 128.

Referring back to the example of FIG. 1B, the process 100 may include a refinement component 136 performing one or more refining processes in order to determine a more accurate feature point track between the first image and the second image. For instance, in some examples, it may not be assumed that the nearest-neighbor match determines the exact same feature point in the first image and the second image (e.g., the feature point track is close, but not exact). As such, the refinement component 136 may perform the one or more refining processes in order to refine the feature point in the first image and/or the feature point in the second image in order to identify the exact same feature point in the first image and the second image. In some examples, the one or more refining processes may include, but are not limited to, cropping the first image and/or the second image, applying planar homography and color correction to the first image and/or the second image, converting the first image and/or the second image to grayscale, equalizing intensity histograms of the first image and/or the second image (e.g., the grayscale images), and computing a subpixel-accurate alignment using cross-correlation values.

Figure 6:
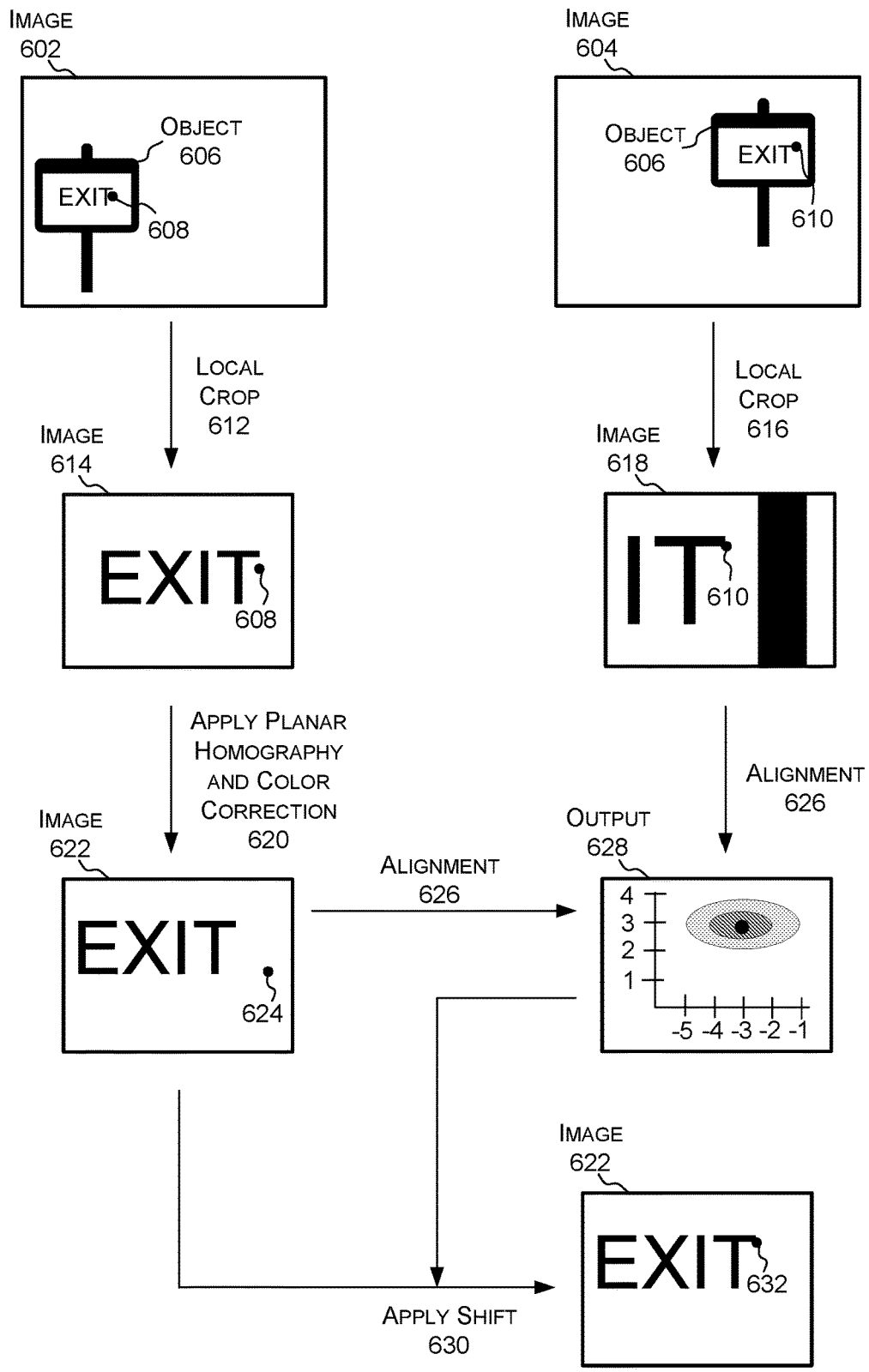
FIG. 6 illustrates an example of tracking a feature point between two images captured by two different image sensors, in accordance with some embodiments of the present disclosure.

For instance, FIG. 6 illustrates an example of tracking a feature point between two images captured by two different image sensors, in accordance with some embodiments of the present disclosure. As shown, a first image 602 represented by the first image data 126 and a second image 604 represented by the second image data 128 may each depict a similar portion of the environment, such as a portion that includes an object 606 (which is a sign in the example of FIG. 6). Based on the matching component 130 performing the nearest-neighbor matching, the matching component 130 may determine an initial estimation for a feature point track that includes a feature point 608 of the first image 602 and a feature point 610 of the second image 604.

In some examples, the matching component 130 may determine the first feature point 608 by projecting the identified point from the first point cloud 502 back to the first image 602 that was used to generate the first point cloud 502 and also determine the second feature point 610 by projecting the identified point from the second point cloud 504 back to the second image 604 that was used to generate the second point cloud 504. As shown by the example of FIG. 6, while the feature point 608 and the feature point 610 look close, the feature point 608 does not exactly align with the feature point 610. Rather, the first feature point 608 and the second feature point 610 are associated with a "starting" point. Because of this, the refinement component 136 may perform the one or more refinement processes to align the feature point 610 with the correct feature point of the first image 602.

For instance, the refinement component 136 may initially perform a local cropping process 612 on the first image 602 to generate a first cropped image 614. The refinement component 136 may also perform a local cropping process 616 on the second image 604 to generate a second cropped image 618. Additionally, the refinement component 136 may use the first parameter data 132 and/or the second parameter data 134 to apply a planar homography and color correction process 620 to at least the first cropped image 614 to generate a processed image 622 that includes a new feature point 624. In some examples, the planar homography and color correction process 620 is associated with correcting the planar distortion between the first image 602 and the second image 604. In some examples, and as described in more detail herein, the refinement component 136 performs the planar homography and color correction process 620 by multiplying the first parameter(s) represented by the first parameter data 132 to the inverse of the second parameter(s) represented by the second parameter data 134. However, in other examples, the refinement component 136 may perform the planar homography and color correction process 620 using any other equation(s) with respect to the first parameter(s) represented by the first parameter data 132 and/or the second parameter(s) represented by the second parameter data 134

The refinement component 136 may then perform a cross-correlation process between the second cropped image 618 and the processed image 622 to find a more precise pixel correspondence. For instance, the cross-correlation process may include an alignment process 626 that includes converting the second cropped image 618 and the processed image 622 to grayscale and/or equalizing their intensity histograms, which is represented by an output 628. The refinement component 136 may then use the output 628 to determine a shift for the feature point 624. For instance, and as shown by the example of FIG. 6, the refinement component 136 may determine that the shift includes moving the feature point 624 about −3 in the x-direction and +3 in the y-direction. As such, the refinement component 136 may perform an alignment process 630 in order to determine a final feature point 632 that corresponds to the feature point 610.

Referring back to the example of FIG. 1B, the system(s) (e.g., the matching component 130 and/or the refinement component 136) may use one or more equations to perform the processes described herein. For instance, the optimization step may yield a set of $M_i$ feature points $\{x_k^W\}_{k=1}^{M_i}$ in the map coordinate system for each of the i=1, ... N image sensors. The k=nearest-neighbor search with the small radius between the point clouds for the image sensor pair (i, j) allows the system(s) to find which pairs of feature tracks (one from the ith image sensor and one from the jth image sensor) are likely to be views of the same feature point.

For instance, consider a map point $x^W$ derived from the nearest-neighbor search. Let the pixel $u_{i,t_1}$ be the projection of $x^W$ into the ith image sensor's image at timestamp $t_1$ (taken from the feature track of the ith image sensor). Following the assumption that map features are locally planar, the system(s) may assume that a small neighborhood of pixels $S_{i,t_1}$ centered upon $u_{i,t_1}$ is an image of a plane. Thus, the following equation may define a planar homography:

$$H_{i,j,t_\alpha,t_2} = \Pi_j (T_L^W(t_2) T_j^L)^{-1} T_L^W(t_1) T_i^L \Pi_i^{-1} \quad (4)$$

The values for $T_i^L$, $T_j^L$, $\Pi_i$, and $\Pi_j$ may come from the first parameter data 132 and/or the second parameter data 134. The last step may then be to perform the cross-correlation between the images $H_{i,j,t_1,t_2}(S_{i,t_1})$ and $S_{j,t_2}$ (e.g., the second cropped image 618 and the processed image 622) to find the more precise pixel correspondence. For instance, and as described herein, that process may include converting the images to greyscale, equalizing the images intensity histograms, and computing a subpixel-accurate alignment using the center of the cross-correlation values.

While the examples above describe performing the processes in order to track a single feature point between two images generated by the first image sensor 122 and the second image sensor 124, in some examples, similar processes may be used to track any number of features points between the two images and/or feature points between any number of images generated by the first image sensor 122 and the second image sensor 124. Additionally, while the examples above describe performing the processes in order to track features between two images generated by just the first image sensor 122 and the second image sensor 124, in some examples, similar processes may be used to track any number of features points between images generated by any number of image sensors.

The process 120 may then include an optimization component 138 that uses the feature points to determine the parameter(s) for calibrating the first image sensor 122 with respect to the second image sensor 124. In some examples, the optimization component 138 may perform similar processes as those described herein with respect to the intersection component 114 and/or the optimization component 116 to determine the parameter(s). For instance, the optimization component 138 may receive LiDAR data 140 generated by a LiDAR sensor 142 (e.g., the LiDAR sensor 142 associated with the first parameter data 132 and/or the second parameter data 134). The optimization component 138 may then perform similar processes as the mapping component 102 to generate a LiDAR map (e.g., a third point cloud) based at least on the LiDAR data 140. The optimization component 138 may then project points between images using the LiDAR map.

For instance, in some examples, the optimization component 138 may use an initial parameter(s) to project a first ray from a first feature point of a first image represented by the first image data 126 to a point of the LiDAR map and then project a second ray from the point of the LiDAR map back to a point of a second image represented by the second image data 128. In some examples, the initial parameter(s) used to project the first ray and/or the second ray may include the first parameter(s) represented by the first parameter data 132, the second parameter(s) represented by the second parameter data 134, and/or a third parameter(s) determined based at least on the first parameter(s) and the second parameter(s) (e.g., the third parameter(s) may be determined by multiplying the first parameter(s) by the inverse of the second parameter(s)). In some examples, the optimization component 138 may perform similar processes to project multiple feature points from the first image to the second image. Additionally, in some examples, the optimization component 138 may perform similar processes to project feature points from multiple images represented by the first image data 126 to other images represented by the second image data 128.

The optimization component 138 may then use the feature points and/or the projected points within the images to determine the parameter(s) for calibrating the first image sensor 122 with respect to the second image sensor 124. For instance, and using the example above, the optimization component 138 may use the projected point of the second image and a second feature point of the second image, wherein the second feature point includes a tracked feature point of the first feature point of first image determined by the refinement component 136, to determine the parameter(s). For example, the optimization component 138 may determine a distance between the projected point and the second feature point. The optimization component 138 may then use one or more equations (e.g., equations (1)-(3)) to determine the parameter(s) based on the distance. In some examples, the optimization component 138 may perform such a process to determine the parameter(s) since the projected point should align with (e.g., include, be within a threshold distance to, etc.) the second feature point when the parameter(s) is correct (and/or substantially correct).

In some examples, the optimization component 138 may perform these processes to determine multiple distances between projected points and feature points for the same two images and/or for any number of images represented by the first image data 126 and 128 generated by the image sensors 122 and 124. The optimization component 138 may then use these distances to determine the parameter(s). For a first example, the optimization component 138 may determine the average of the differences and then use the average of the differences to determine the parameter(s). For a second examples, the optimization component 138 may determine the minimum, median, mode, and/or maximum of the distances and then use that distance to determine the parameter(s). Additionally, in such examples, the optimization component 138 may filter out one or more of the distances, such as one or more distances that are greater than a threshold distance (e.g., outlier distances) and/or one or more distances that are associated with tracked feature points that include a low confidence.

In some examples, the optimization component 138 may then repeat these processes in order continue refining the parameter(s). For example, the optimization component 138 may perform similar processes, but with using the newly determined parameter(s) for projecting the rays, to continue determining a new parameter(s) for calibrating the first image sensor 122 with respect to the second image sensor 124. In some examples, the optimization component 138 may continue performing these processes until one or more events occur, such as the difference(s) used to determining the parameter(s) being less than a threshold distance. This is because, as described above, when the parameter(s) is correct (and/or substantially correct), the projected points that are reprojected back to the second image should align with the tracked feature points.

Figure 7A:
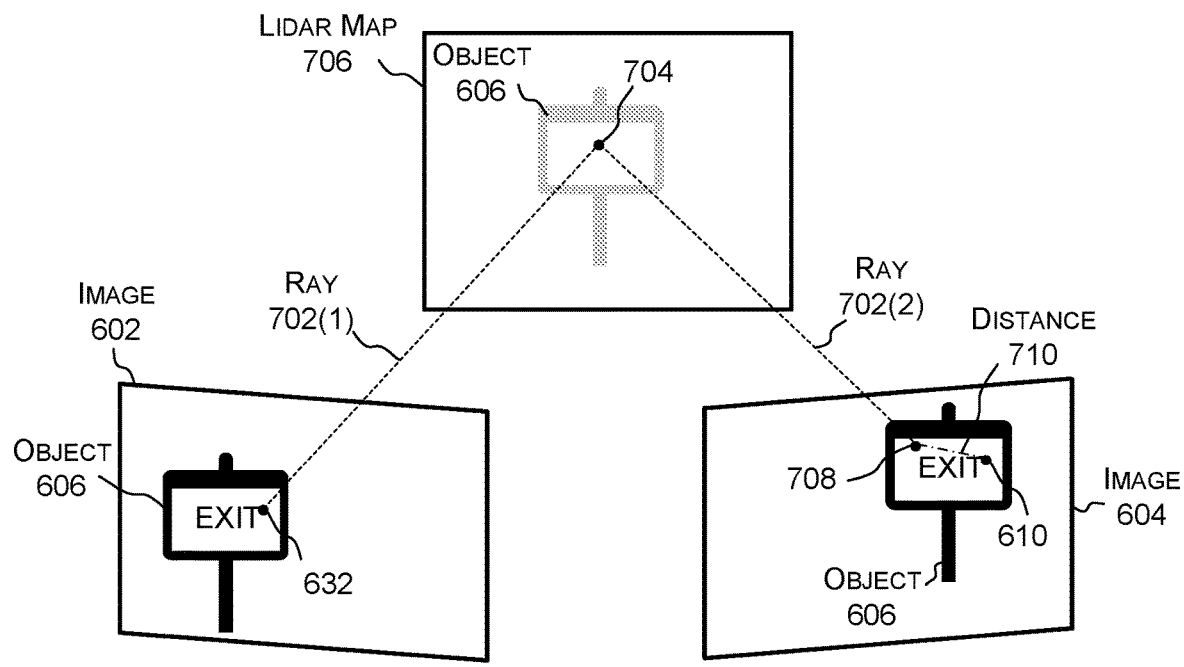
FIGS. 7A-7C illustrate an example of optimizing a parameter(s) for calibrating a first image sensor with respect to a second image sensor, in accordance with some embodiments of the present disclosure.
Figure 7B:
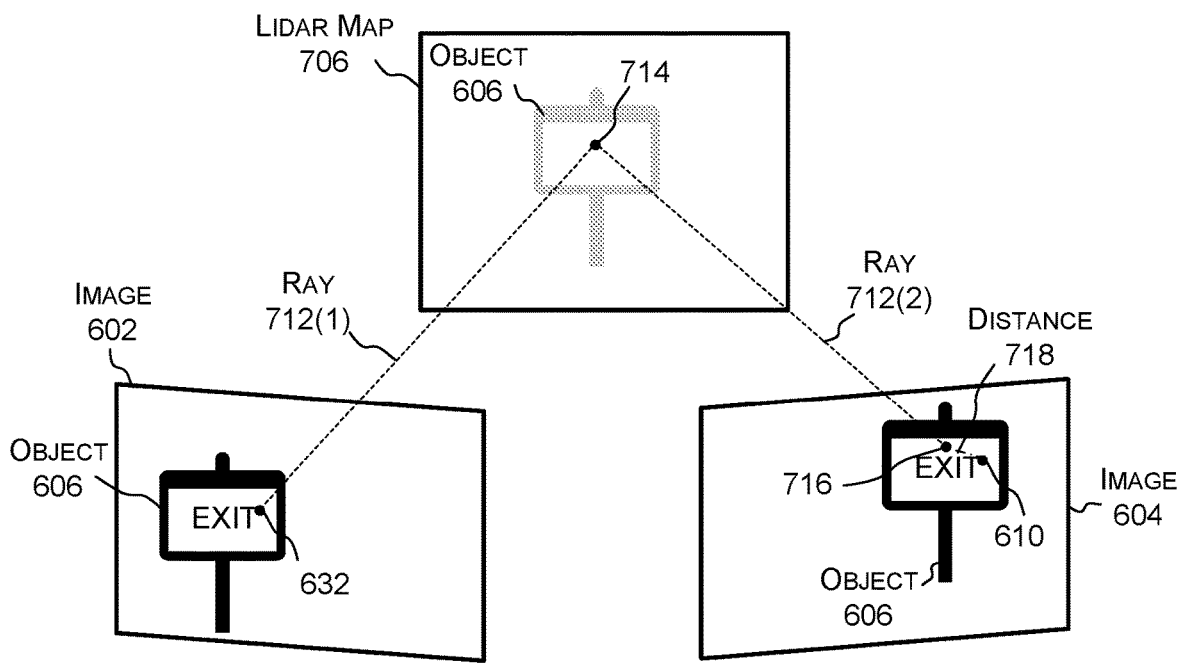
Figure 7C:
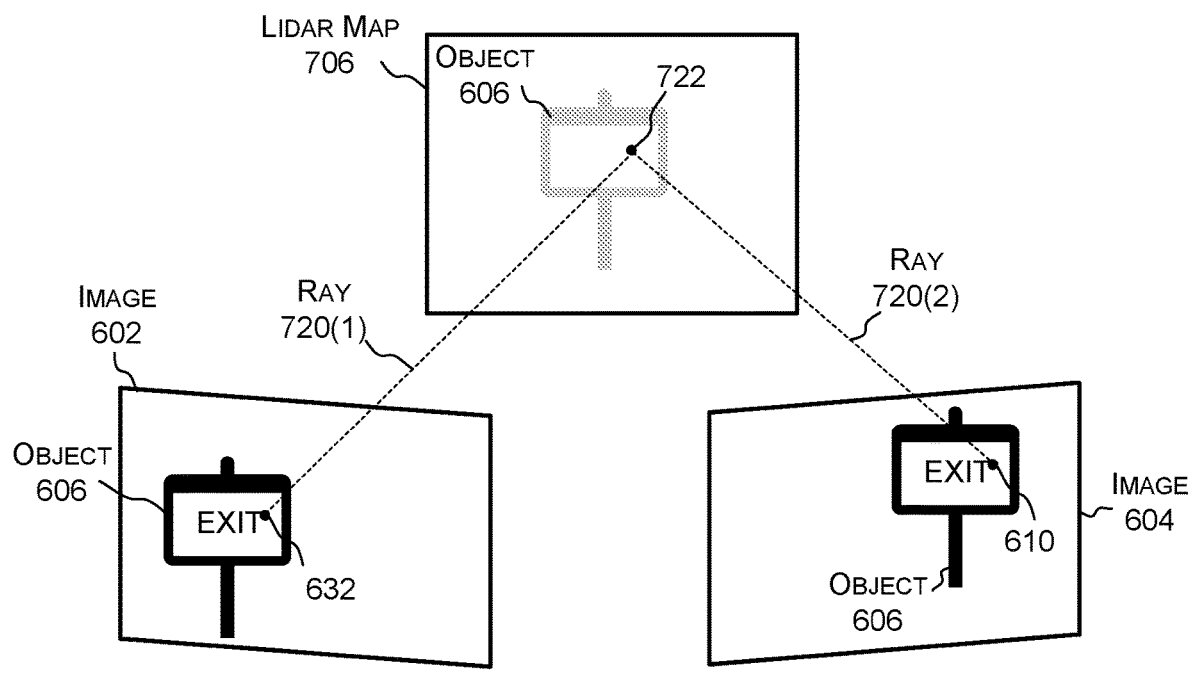

For instance, FIGS. 7A-7C illustrate an example of optimizing a parameter(s) for calibrating the first image sensor 122 with respect to the second image sensor 124, in accordance with some embodiments of the present disclosure. As shown by the example of FIG. 7A, the optimization component 138 may project a first ray 702(1) from the feature point 632 of the first image 602 to a point 704 of a LiDAR map 706 generated using the LiDAR data 140. In some examples, the optimization component 138 projects the first ray 702(1) from the center of the first image sensor 122 using the first parameter(s) represented by the first parameter data 132, the second parameter(s) represented by the second parameter data 134, and/or a third parameter(s) determined based at least on the first parameter(s) and the second parameter(s). The optimization component 138 may then project a second ray 702(2) from the point 704 of the LiDAR map 706 to a point 708 of the second image 604. In some examples, the optimization component 138 projects the second ray 702(2) based on the center of the second image sensor 124 and/or using the same parameter(s) that was used for projecting the first ray 702(1). The optimization component 138 may then determine a first calibrated parameter(s) using the point 708 and the feature point 610 that includes the tracked feature point from the feature point 632. For example, the optimization component 138 may determine a distance 710 between the point 708 and the feature point 610. The optimization component 138 may then determine the first calibrated parameter(s) based at least on the distance 710.

While the example of FIG. 7A only illustrates projecting one feature point 632 from the first image 602 to the second image 604, in other examples, the optimization component 138 may perform similar processes to project multiple feature points from the first image 602 to the second image 604. The optimization component 138 may then determine differences associated with multiple projected points and features points associated with the second image 604. Additionally, while the example of FIG. 7A only illustrates projecting feature points between two images 602 and 604, in other examples, the optimization component 138 may perform similar processes to project feature points between multiple images represented by the first image data 126 and multiple images represented by the second image data 128. The optimization component 138 may then determine differences associated with multiple projected points and features points associated with the multiple images. In any of these examples, the optimization component 138 may further use one or more of the processes described herein to determine the first calibrated parameter(s) using the differences.

The optimization component 138 may then continue to perform these processes to refine the first calibrated parameter(s). For instance, and shown by the example of FIG. 7B, the optimization component 138 may project a first ray 712(1) from the feature point 632 of the first image 602 to a point 714 of the LiDAR map 706. In some examples, the optimization component 138 projects the first ray 702(1) from the center of the first image sensor 122 using the first calibrated parameter(s) from the example of FIG. 7A. The optimization component 138 may then project a second ray 712(2) from the point 714 of the LiDAR map 706 to a point 716 of the second image 604. In some examples, the optimization component 138 projects the second ray 712(2) based on the center of the second image sensor 124 using the first calibrated parameter(s) from the example of FIG. 7A. The optimization component 138 may then determine a second calibrated parameter(s) using the point 716 and the feature point 610. For example, the optimization component 138 may determine a distance 718 between the point 716 and the feature point 610. The optimization component 138 may then determine the second calibrated parameter(s) based at least on the distance 718 (and/or multiple distances, using the processes described herein).

As shown by the examples of FIGS. 7A-7B, the distance 718 associated with the second optimization process that is performed is less than the distance 710 of the first optimization process. This may be because the first calibrated parameter(s) that was used to project the rays 712(1)-(2) was more accurate than the initial parameter(s) that was used to project the rays 702(1)-(2). In other words, each time the optimization component 138 performs a new optimization process using the calibrated parameter(s) determined during the previous optimization process, the optimization component 138 determines a parameter(s) that is closer to the actual parameter(s) that will calibrate the first image sensor 122 with respect to the second image sensor 124. As such, and in some examples, the optimization component 138 may continue to perform these processes until one or more events occur.

For instance, and as shown by the example of FIG. 7C, the optimization component 138 may project a first ray 720(1) from the feature point 632 of the first image 602 to a point 722 of the LiDAR map 706. In some examples, the optimization component 138 projects the first ray 720(1) from the center of the first image sensor 122 using the second calibrated parameter(s) (e.g., determined in the example of FIG. 7B) associated with the first image sensor 122. The optimization component 138 may then project a second ray 720(2) from the point 722 of the LiDAR map 706 to a point of the second image 604. In some examples, the optimization component 738 projects the second ray 720(2) based on the center of the second image sensor 124 and/or using the second calibrated parameter(s). As shown by the example of FIG. 7C, the projected point of the second image 604 includes the feature point 610. As such, the optimization component 138 may determine that the second calibrated parameter(s) includes the actual parameter(s) that calibrate the first image sensor 122 with respect to the second image sensor 124.

While the example of FIG. 7A-7C describe the calibration process as ending when the projected point includes the feature point 610, in other examples, the calibration process may end when one or more additional and/or alternative events occur. For a first example, the optimization component 138 may continue to perform these processes until one or more of the projected points are within a threshold distance to one or more corresponding tracked feature points. For a second example, the optimization component 138 may continue to perform these processes a threshold number of time. The threshold number of times may include, but is not limited to, one time, two times, five times, ten times, and/or any other number of times.

Referring back to the example of FIG. 1B, the process 120 may include outputting parameter data 144 associated with the optimization. For instance, and as described herein, the parameter(s) represented by the parameter data 144 may include one or more translation dimensions and/or one or more rotation dimensions. For example, the one or more translation dimensions may include, but are not limited to, a translation in the x-direction, a translation in the y-direction, and/or a translation in the z-direction. The one or more rotation dimensions may include, but are not limited to, a roll rotation, a yaw rotation, and/or a pitch rotation. In some examples, the system(s) may repeat the process 120 to calibrate additional image sensors together.

While the examples above describe calibrating an image sensor with respect to a LiDAR sensor and/or another image sensor, in some examples, the system(s) may perform additional processes in order to optimize the lens parameters of the image sensor. For instance, and as described herein, the system(s) (e.g., the optimization component 116 and/or the optimization component 138) may use a captured rays-based model for the image sensor projections with a high-order polynomial function (with degree D) of the ray angle to capture distortion. As such, give a point $P=[p_y, p_z]$ in the center of the image sensor world coordinate system, the system(s) may compute the projected pixel u using the following equations:

$$\dot{p}=[p_x/p_z, p_y/p_z], r=\|\dot{p}\|, \theta=\tan^{-1} r \quad (5)$$

$$f(\theta)=\Sigma_{i=1}^{D} k_i \theta^i \quad (6)$$

$$u=\Pi(p)=(f(\theta)/r)\dot{p}+u_0 \quad (7)$$

In equations (5)-(7), the lens parameters are the polynomial coefficients $k_i$ and the optical center $u_0$, and $\theta$ is the angle of the ray with the optical axis. In some examples, since the system(s) uses an initial guess for the intrinsic parameters in the optimization scheme, the system(s) may solve for an approximate inverse $f^{-1}(x) \approx \Sigma_{i=1}^{D} m_i x^i$. In some examples, rather than optimizing $\{k_i\}$ and $\{m_i\}$, the system(s) introduces a scale factor $s_f$:

$$f(s_f \theta)=\Sigma_{i=1}^{D}(s_f^i k_i)\theta^i \quad (8)$$

The polynomial coefficients may then be fixed from the initial guess. In some examples, this factor may be applied analytically to the approximate inverse without introducing much additional error. In some examples, such as in formulation, the intrinsic parameters are turned by solving for $s_f$ and $u_0$.

While the examples described herein discuss aligning a first image sensor 122 with a second image sensor 124, in some examples, similar processes may be used to align any number of images sensors together. For example, similar processes may be used to align the first image sensor 122 and/or the second image sensor 124 may one or more additional image sensors (e.g., five image sensors, ten image sensors, twenty image sensors, and/or any other number of image sensors).

Now referring to FIGS. 8-10 each block of methods 800-1000, described herein, comprises a computing process that may be performed using any combination of hardware, firmware, and/or software. For instance, various functions may be carried out by a processor executing instructions stored in memory. The methods 800-1000 may also be embodied as computer-usable instructions stored on computer storage media. The methods 800-1000 may be provided by a standalone application, a service or hosted service (standalone or in combination with another hosted service), or a plug-in to another product, to name a few. In addition, the method 800-1000 are described, by way of example, with respect to FIGS. 1A-1B. However, these methods may additionally or alternatively be executed by any one system, or any combination of systems, including, but not limited to, those described herein.

FIG. 8 is a flow diagram showing a method 800 for calibrating an image sensor with respect to a LiDAR sensor, in accordance with some embodiments of the present disclosure. The method 800, at block B802, may include generating, based at least on LiDAR data generated using a LiDAR sensor of a machine, a point cloud. For instance, the system(s) (e.g., the mapping component 102, etc.) may generate the LiDAR map 104 using the LiDAR data 106, where the LiDAR map 104 may correspond to a point cloud. For instance, the LiDAR data 106 may represent one or more LiDAR scans of an environment that is exterior to the machine, such as when the machine is navigating through the environment. As such, the system(s) may use one or more processes, such as ICP alignment, to generate the LiDAR map 104 using the LiDAR data 106 and/or additional sensor data (e.g., ego-motion data).

The method 800, at block B804, may include determining, based at least on image data generated using an image sensor of the machine, that a first point of a first image tracks to a second point of a second image. For instance, the system(s) (e.g., the feature component 108, the intersection component 114, etc.) may determine, using the image data 112, that the first point of the first image tracks to the second point of the second image. As described herein, the first image may be generated by the image sensor at a first time and the second image may be generated by the image sensor at a second, later time as the machine is navigating through the environment. In some examples, the system(s) may perform similar processes to track multiple points from the first image to the second image.

The method 800, at block B806, may include determining that the first point of the first image and a third point of the second image correspond to a fourth point of the point cloud. For instance, the system(s) (e.g., the intersection component 114, etc.) may determine that the first point of the first image corresponds to the fourth point of the point cloud and then determine that the fourth point of the point cloud corresponds to the third point of the second image. In some examples, the system(s) makes the determination by projecting, using one or more parameters (e.g., one or more initial parameters, one or more parameters determined during a previous calibration process, etc.), a first ray from the first point of the first image to the fourth point of the point cloud and then a second ray from the fourth point of the point cloud to the third point of the second image.

The method 800, at block B808, may include determining, based at least on the second point of the second image and the third point of the second image, one or more values for one or more parameters for calibrating the image sensor with respect to the LiDAR sensor. For instance, the system(s) (e.g., optimization component 116, etc.) may determine the value(s) for the parameter(s) using the second point of the second image and the third point of the second image. In some examples, to determine the value(s) for the parameter(s), the system(s) may determine a distance between the second point and the third point. The system(s) may then determine the value(s) for the parameter(s) based on the distance. In some examples, the system(s) may then continue to perform the method 800 of FIG. 8 (e.g., at least blocks B806 and B808), using the determined value(s) for the parameter(s), to further refine the value(s) for the parameter(s).

FIG. 9 is a flow diagram showing a method 900 for calibrating a first image sensor with respect to a second image sensor, in accordance with some embodiments of the present disclosure. The method 900, at block B902, may include determining that a first point of a first image represented by first image data generated using a first image sensor of a machine tracks to a second point of a second image represented by second image data generated using a second image sensor of the machine. For instance, the system(s) (e.g., the matching component 130, the refinement component 136, etc.) may track the first point of the first image to the second point of the second image. In some examples, the system(s) may perform the tracking using at least a portion of the method 1000 of FIG. 10.

The method 900, at block B904, may include generating, based at least on LiDAR data generated by a LiDAR sensor of the machine, a point cloud. For instance, the system(s) (e.g., the optimization component 138, etc.) may generate a LiDAR map using the LiDAR data 140, where the LiDAR map may correspond to a point cloud. For instance, the LiDAR data 106 may represent one or more LiDAR scans of an environment that is exterior to the machine, such as when the machine is navigating through the environment. As such, the system(s) may use one or more processes, such as ICP alignment, to generate the LiDAR map using the LiDAR data 140 and/or additional sensor data (e.g., motion data).

The method 900, at block B906, may include determining that the first point of the first image and a third point of the second image correspond to a fourth point of the point cloud. For instance, the system(s) (e.g., the optimization component 138, etc.) may determine that the first point of the first image corresponds to the fourth point of the point cloud and then determine that the fourth point of the point cloud corresponds to the third point of the second image. In some examples, the system(s) makes the determination by projecting, using one or more parameters (e.g., one or more initial parameters, one or more parameters determined during a previous calibration process, etc.), a first ray from the first point of the first image to the fourth point of the point cloud and then a second ray from the fourth point of the point cloud to the third point of the second image.

The method 900, at block B908, may include determining, based at least on the second point of the second image and the third point of the second image, one or more values for one or more parameters for calibrating the first image sensor with respect to the second image sensor. For instance, the system(s) (e.g., optimization component 138, etc.) may determine the value(s) for the parameter(s) using the second point of the second image and the third point of the second image. In some examples, to determine the value(s) for the parameter(s), the system(s) may determine a distance between the second point and the third point. The system(s) may then determine the parameter(s) based on the distance. In some examples, the system(s) may then continue to perform the method 900 of FIG. 9 (e.g., at least blocks B906 and B908), using the determined value(s) for the parameter(s), to further refine the value(s) for the parameter(s).

FIG. 10 is a flow diagram showing another method 1000 for calibrating a first image sensor with respect to a second image sensor, in accordance with some embodiments of the present disclosure. The method 1000, at block B1002, may include determining one or more first values for one or more first parameters for calibrating a first image sensor of a machine with respect to a LiDAR sensor of the machine and one or more second values for one or more second parameters for calibrating a second image sensor of the machine with respect to the LiDAR sensor. For instance, the system(s) (e.g., the matching component 130, etc.) may determine the first value(s) for the first parameter(s) represented by the first parameter data 132 and the second value(s) for the second parameter(s) represented by the second parameter data 134, where the first value(s) for the first parameter(s) calibrate the first image sensor 122 with respect to the LiDAR sensor 142 and the second value(s) for the second parameter(s) calibrate the second image sensor 124 with respect to the LiDAR sensor 142. In some examples, the system(s) determines the first value(s) for the first parameter(s) and/or the value(s) for the second parameter(s) using the process 100 of FIG. 1A. In some examples, the system(s) determines the first value(s) for the first parameter(s) and/or the second value(s) for the second parameter(s) using one or more additional and/or alternative calibrating processes.

The method 1000, at block B1004, may include generating, based at least on the one or more first values and first image data generated by the first image sensor, a first point cloud. For instance, the system(s) (e.g., the matching component 130, etc.) may generate the first point cloud using the first value(s) for the first parameter(s) and the first image data 126 generated by the first image sensor 122. As described herein, the first point cloud may represent one or more first 3D points within an environment that correspond to one or more feature points of a first image represented by the first image data 126.

The method 1000, at block B1006, may include generating, based at least on the one or more second values and second image data generated using the second image sensor, a second point cloud. For instance, the system(s) (e.g., the matching component 130, etc.) may generate the second point cloud using the second value(s) for the second parameter(s) and the second image data 128 generated using the second image sensor 124. As described herein, the second point cloud may represent one or more second 3D points within the environment that correspond to one or more feature points of a second image represented by the second image data 126.

The method 1000, at block B1008, may include determining, based at least on the first point cloud and the second point cloud, one or more third values for one or more third parameters for calibrating the first image sensor with respect to the second image sensor. For instance, the system(s) (e.g., the matching component 130, the refinement component 136, the optimization component 136, etc.) may use the first point cloud and the second point cloud to determine that a first feature point of the first image tracks to a second feature point of the second image. The system(s) may then perform one or more processes, such as a process similar to the process 100 of FIG. 1, using the feature points to determine the third value(s) for the third parameter(s) for calibrating the first image sensor 122 with respect to the second image sensor 124.

Example Autonomous Vehicle

Figure 11A:
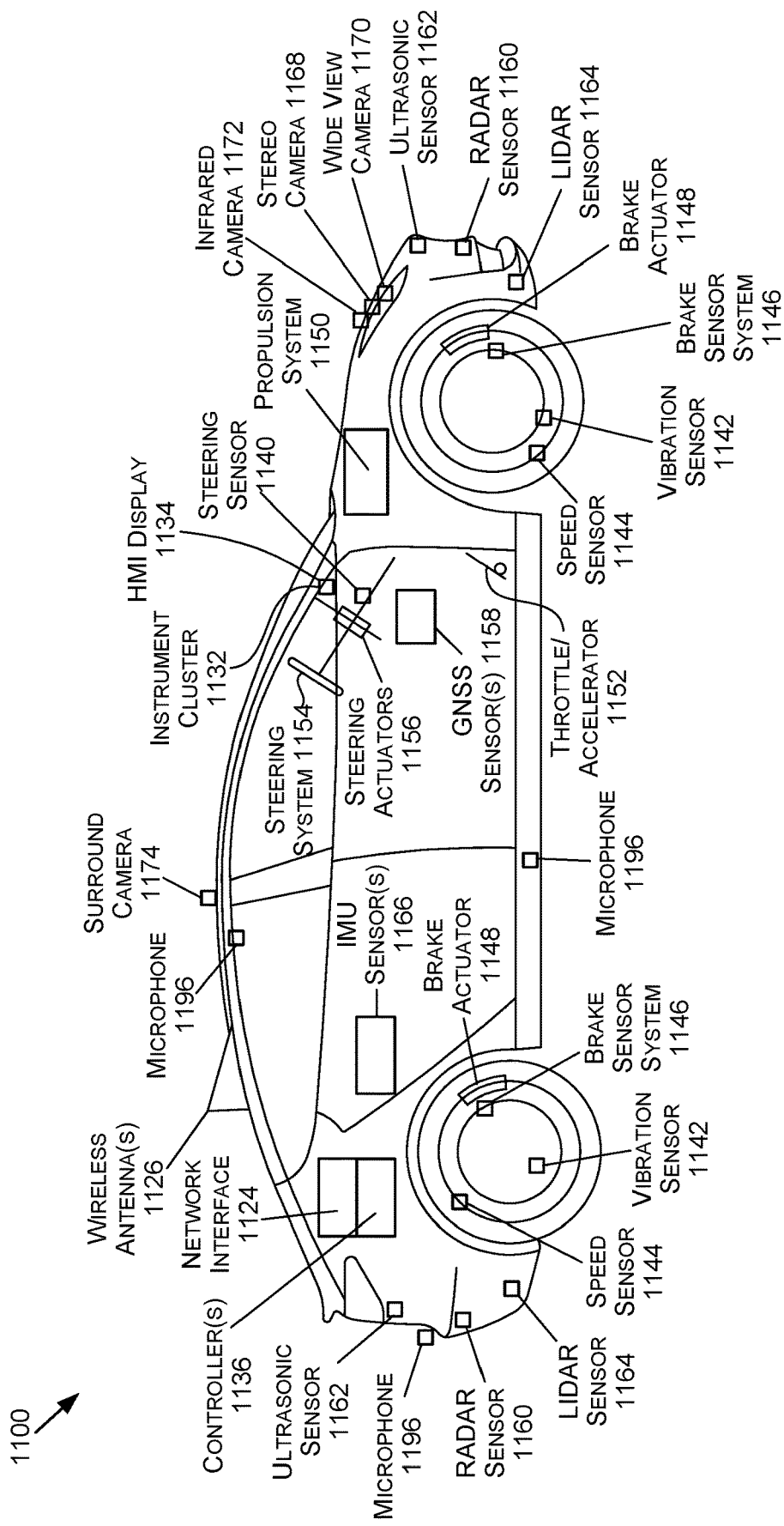
FIG. 11A is an illustration of an example autonomous vehicle, in accordance with some embodiments of the present disclosure.

FIG. 11A is an illustration of an example autonomous vehicle 1100, in accordance with some embodiments of the present disclosure. The autonomous vehicle 1100 (alternatively referred to herein as the "vehicle 1100") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1100 may be capable of functionality in accordance with one or more of Level 3-Level 5 of the autonomous driving levels. The vehicle 1100 may be capable of functionality in accordance with one or more of Level 1-Level 5 of the autonomous driving levels. For example, the vehicle 1100 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1100 or other machine, such as being fully autonomous, being highly autonomous, being conditionally autonomous, being partially autonomous, providing assistive autonomy, being semi-autonomous, being primarily autonomous, or other designation.

The vehicle 1100 may include components such as a chassis, a vehicle body, wheels (e.g., 2, 4, 6, 8, 18, etc.), tires, axles, and other components of a vehicle. The vehicle 1100 may include a propulsion system 1150, such as an internal combustion engine, hybrid electric power plant, an all-electric engine, and/or another propulsion system type. The propulsion system 1150 may be connected to a drive train of the vehicle 1100, which may include a transmission, to enable the propulsion of the vehicle 1100. The propulsion system 1150 may be controlled in response to receiving signals from the throttle/accelerator 1152.

A steering system 1154, which may include a steering wheel, may be used to steer the vehicle 1100 (e.g., along a desired path or route) when the propulsion system 1150 is operating (e.g., when the vehicle is in motion). The steering system 1154 may receive signals from a steering actuator 1156. The steering wheel may be optional for full automation (Level 5) functionality.

The brake sensor system 1146 may be used to operate the vehicle brakes in response to receiving signals from the brake actuators 1148 and/or brake sensors.

Controller(s) 1136, which may include one or more system on chips (SoCs) 1104 (FIG. 11C) and/or GPU(s), may provide signals (e.g., representative of commands) to one or more components and/or systems of the vehicle 1100. For example, the controller(s) may send signals to operate the vehicle brakes via one or more brake actuators 1148, to operate the steering system 1154 via one or more steering actuators 1156, to operate the propulsion system 1150 via one or more throttle/accelerators 1152. The controller(s) 1136 may include one or more onboard (e.g., integrated) computing devices (e.g., supercomputers) that process sensor signals, and output operation commands (e.g., signals representing commands) to enable autonomous driving and/or to assist a human driver in driving the vehicle 1100. The controller(s) 1136 may include a first controller 1136 for autonomous driving functions, a second controller 1136 for functional safety functions, a third controller 1136 for artificial intelligence functionality (e.g., computer vision), a fourth controller 1136 for infotainment functionality, a fifth controller 1136 for redundancy in emergency conditions, and/or other controllers. In some examples, a single controller 1136 may handle two or more of the above functionalities, two or more controllers 1136 may handle a single functionality, and/or any combination thereof.

The controller(s) 1136 may provide the signals for controlling one or more components and/or systems of the vehicle 1100 in response to sensor data received from one or more sensors (e.g., sensor inputs). The sensor data may be received from, for example and without limitation, global navigation satellite systems ("GNSS") sensor(s) 1158 (e.g., Global Positioning System sensor(s)), RADAR sensor(s) 1160, ultrasonic sensor(s) 1162, LiDAR sensor(s) 1164, inertial measurement unit (IMU) sensor(s) 1166 (e.g., accelerometer(s), gyroscope(s), magnetic compass(es), magnetometer(s), etc.), microphone(s) 1196, stereo camera(s) 1168, wide-view camera(s) 1170 (e.g., fisheye cameras), infrared camera(s) 1172, surround camera(s) 1174 (e.g., 360 degree cameras), long-range and/or mid-range camera(s) 1198, speed sensor(s) 1144 (e.g., for measuring the speed of the vehicle 1100), vibration sensor(s) 1142, steering sensor(s) 1140, brake sensor(s) (e.g., as part of the brake sensor system 1146), and/or other sensor types.

One or more of the controller(s) 1136 may receive inputs (e.g., represented by input data) from an instrument cluster 1132 of the vehicle 1100 and provide outputs (e.g., represented by output data, display data, etc.) via a human-machine interface (HMI) display 1134, an audible annunciator, a loudspeaker, and/or via other components of the vehicle 1100. The outputs may include information such as vehicle velocity, speed, time, map data (e.g., the High Definition ("HD") map 1122 of FIG. 11C), location data (e.g., the vehicle's 1100 location, such as on a map), direction, location of other vehicles (e.g., an occupancy grid), information about objects and status of objects as perceived by the controller(s) 1136, etc. For example, the HMI display 1134 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1100 further includes a network interface 1124 which may use one or more wireless antenna(s) 1126 and/or modem(s) to communicate over one or more networks. For example, the network interface 1124 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1126 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 11B:
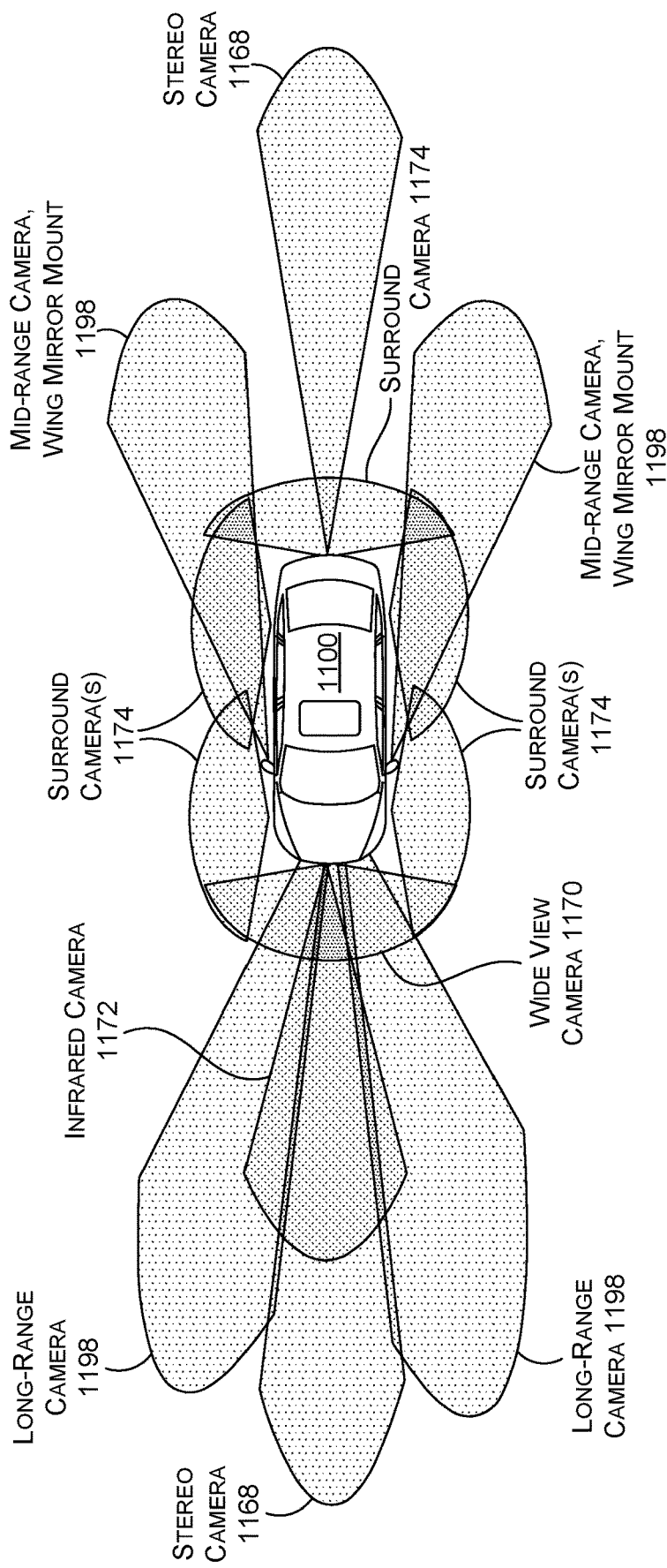
FIG. 11B is an example of camera locations and fields of view for the example autonomous vehicle of FIG. 11A, in accordance with some embodiments of the present disclosure.

FIG. 11B is an example of camera locations and fields of view for the example autonomous vehicle 1100 of FIG. 11A, in accordance with some embodiments of the present disclosure. The cameras and respective fields of view are one example embodiment and are not intended to be limiting. For example, additional and/or alternative cameras may be included and/or the cameras may be located at different locations on the vehicle 1100.

The camera types for the cameras may include, but are not limited to, digital cameras that may be adapted for use with the components and/or systems of the vehicle 1100. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1100 (e.g., front-facing cameras) may be used for surround view, to help identify forward facing paths and obstacles, as well aid in, with the help of one or more controllers 1136 and/or control SoCs, providing information critical to generating an occupancy grid and/or determining the preferred vehicle paths. Front-facing cameras may be used to perform many of the same ADAS functions as LiDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1170 that may be used to perceive objects coming into view from the periphery (e.g., pedestrians, crossing traffic or bicycles). Although only one wide-view camera is illustrated in FIG. 11B, there may be any number (including zero) of wide-view cameras 1170 on the vehicle 1100. In addition, any number of long-range camera(s) 1198 (e.g., a long-view stereo camera pair) may be used for depth-based object detection, especially for objects for which a neural network has not yet been trained. The long-range camera(s) 1198 may also be used for object detection and classification, as well as basic object tracking.

Any number of stereo cameras 1168 may also be included in a front-facing configuration. In at least one embodiment, one or more of stereo camera(s) 1168 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1168 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1168 may be used in addition to, or alternatively from, those described herein.

Cameras with a field of view that include portions of the environment to the side of the vehicle 1100 (e.g., side-view cameras) may be used for surround view, providing information used to create and update the occupancy grid, as well as to generate side impact collision warnings. For example, surround camera(s) 1174 (e.g., four surround cameras 1174 as illustrated in FIG. 11B) may be positioned to on the vehicle 1100. The surround camera(s) 1174 may include wide-view camera(s) 1170, fisheye camera(s), 360 degree camera(s), and/or the like. Four example, four fisheye cameras may be positioned on the vehicle's front, rear, and sides. In an alternative arrangement, the vehicle may use three surround camera(s) 1174 (e.g., left, right, and rear), and may leverage one or more other camera(s) (e.g., a forward-facing camera) as a fourth surround view camera.

Cameras with a field of view that include portions of the environment to the rear of the vehicle 1100 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1198, stereo camera(s) 1168), infrared camera(s) 1172, etc.), as described herein.

Figure 11C:
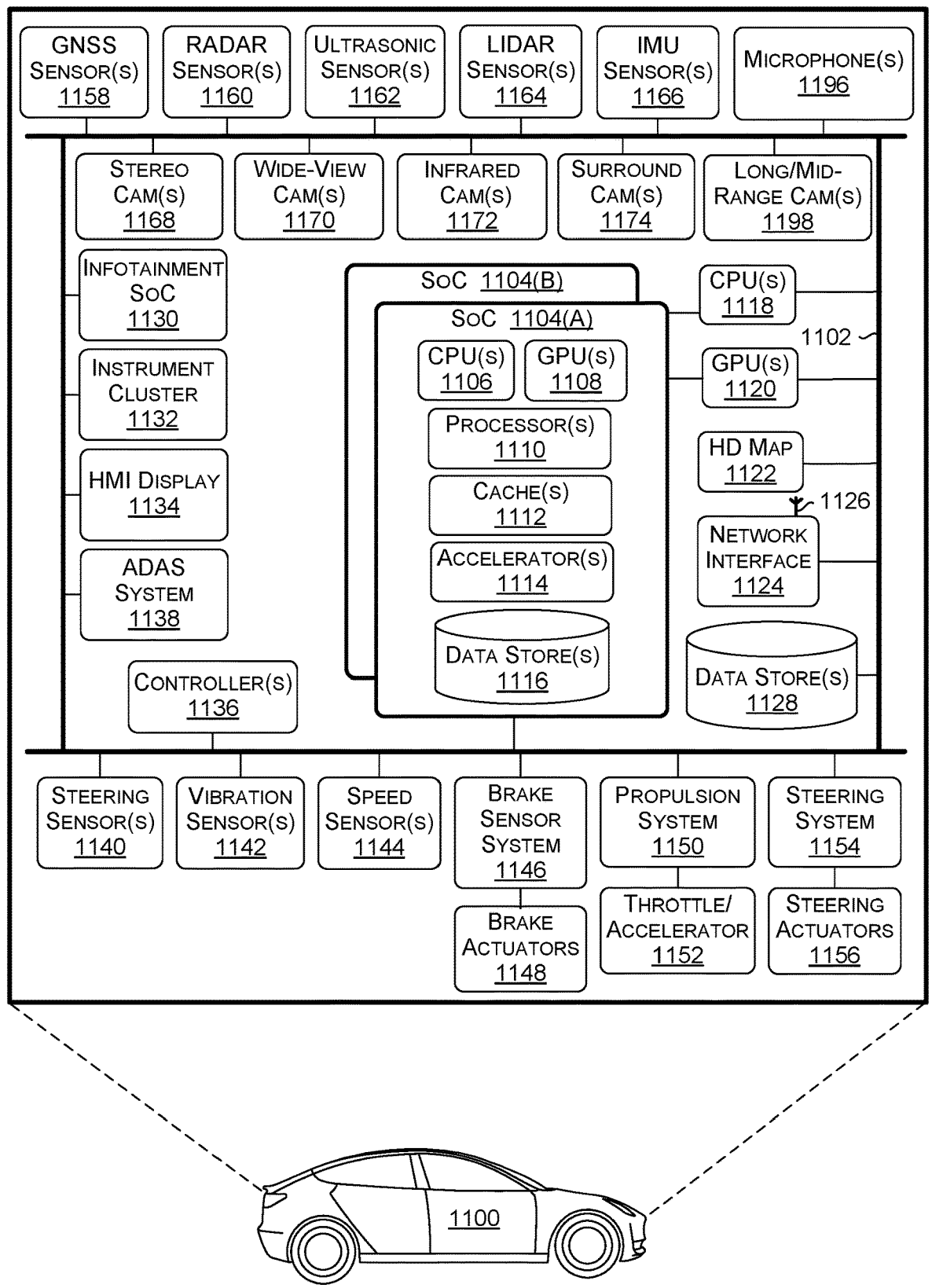
FIG. 11C is a block diagram of an example system architecture for the example autonomous vehicle of FIG. 11A, in accordance with some embodiments of the present disclosure.

FIG. 11C is a block diagram of an example system architecture for the example autonomous vehicle 1100 of FIG. 11A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1100 in FIG. 11C are illustrated as being connected via bus 1102. The bus 1102 may include a Controller Area Network (CAN) data interface (alternatively referred to herein as a "CAN bus"). A CAN may be a network inside the vehicle 1100 used to aid in control of various features and functionality of the vehicle 1100, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1102 is described herein as being a CAN bus, this is not intended to be limiting. For example, in addition to, or alternatively from, the CAN bus, FlexRay and/or Ethernet may be used. Additionally, although a single line is used to represent the bus 1102, this is not intended to be limiting. For example, there may be any number of busses 1102, which may include one or more CAN busses, one or more FlexRay busses, one or more Ethernet busses, and/or one or more other types of busses using a different protocol. In some examples, two or more busses 1102 may be used to perform different functions, and/or may be used for redundancy. For example, a first bus 1102 may be used for collision avoidance functionality and a second bus 1102 may be used for actuation control. In any example, each bus 1102 may communicate with any of the components of the vehicle 1100, and two or more busses 1102 may communicate with the same components. In some examples, each SoC 1104, each controller 1136, and/or each computer within the vehicle may have access to the same input data (e.g., inputs from sensors of the vehicle 1100), and may be connected to a common bus, such the CAN bus.

The vehicle 1100 may include one or more controller(s) 1136, such as those described herein with respect to FIG. 11A. The controller(s) 1136 may be used for a variety of functions. The controller(s) 1136 may be coupled to any of the various other components and systems of the vehicle 1100, and may be used for control of the vehicle 1100, artificial intelligence of the vehicle 1100, infotainment for the vehicle 1100, and/or the like.

The vehicle 1100 may include a system(s) on a chip (SoC) 1104. The SoC 1104 may include CPU(s) 1106, GPU(s) 1108, processor(s) 1110, cache(s) 1112, accelerator(s) 1114, data store(s) 1116, and/or other components and features not illustrated. The SoC(s) 1104 may be used to control the vehicle 1100 in a variety of platforms and systems. For example, the SoC(s) 1104 may be combined in a system (e.g., the system of the vehicle 1100) with an HD map 1122 which may obtain map refreshes and/or updates via a network interface 1124 from one or more servers (e.g., server(s) 1178 of FIG. 11D).

The CPU(s) 1106 may include a CPU cluster or CPU complex (alternatively referred to herein as a "CCPLEX"). The CPU(s) 1106 may include multiple cores and/or L2 caches. For example, in some embodiments, the CPU(s) 1106 may include eight cores in a coherent multi-processor configuration. In some embodiments, the CPU(s) 1106 may include four dual-core clusters where each cluster has a dedicated L2 cache (e.g., a 2 MB L2 cache). The CPU(s) 1106 (e.g., the CCPLEX) may be configured to support simultaneous cluster operation enabling any combination of the clusters of the CPU(s) 1106 to be active at any given time.

The CPU(s) 1106 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1106 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1108 may include an integrated GPU (alternatively referred to herein as an "iGPU"). The GPU(s) 1108 may be programmable and may be efficient for parallel workloads. The GPU(s) 1108, in some examples, may use an enhanced tensor instruction set. The GPU(s) 1108 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1108 may include at least eight streaming microprocessors. The GPU(s) 1108 may use compute application programming interface(s) (API(s)). In addition, the GPU(s) 1108 may use one or more parallel computing platforms and/or programming models (e.g., NVIDIA's CUDA).

The GPU(s) 1108 may be power-optimized for best performance in automotive and embedded use cases. For example, the GPU(s) 1108 may be fabricated on a Fin field-effect transistor (FinFET). However, this is not intended to be limiting and the GPU(s) 1108 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1108 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1108 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1108 to access the CPU(s) 1106 page tables directly. In such examples, when the GPU(s) 1108 memory management unit (MMU) experiences a miss, an address translation request may be transmitted to the CPU(s) 1106. In response, the CPU(s) 1106 may look in its page tables for the virtual-to-physical mapping for the address and transmits the translation back to the GPU(s) 1108. As such, unified memory technology may allow a single unified virtual address space for memory of both the CPU(s) 1106 and the GPU(s) 1108, thereby simplifying the GPU(s) 1108 programming and porting of applications to the GPU(s) 1108.

In addition, the GPU(s) 1108 may include an access counter that may keep track of the frequency of access of the GPU(s) 1108 to memory of other processors. The access counter may help ensure that memory pages are moved to the physical memory of the processor that is accessing the pages most frequently.

The SoC(s) 1104 may include any number of cache(s) 1112, including those described herein. For example, the cache(s) 1112 may include an L3 cache that is available to both the CPU(s) 1106 and the GPU(s) 1108 (e.g., that is connected both the CPU(s) 1106 and the GPU(s) 1108). The cache(s) 1112 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1104 may include an arithmetic logic unit(s) (ALU(s)) which may be leveraged in performing processing with respect to any of the variety of tasks or operations of the vehicle 1100—such as processing DNNs. In addition, the SoC(s) 1104 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1106 and/or GPU(s) 1108.

The SoC(s) 1104 may include one or more accelerators 1114 (e.g., hardware accelerators, software accelerators, or a combination thereof). For example, the SoC(s) 1104 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1108 and to off-load some of the tasks of the GPU(s) 1108 (e.g., to free up more cycles of the GPU(s) 1108 for performing other tasks). As an example, the accelerator(s) 1114 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1114 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1108, and by using an inference accelerator, for example, a designer may target either the DLA(s) or the GPU(s) 1108 for any function. For example, the designer may focus processing of CNNs and floating point operations on the DLA(s) and leave other functions to the GPU(s) 1108 and/or other accelerator(s) 1114.

The accelerator(s) 1114 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1106. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1114 (e.g., the hardware acceleration cluster) may include a computer vision network on-chip and SRAM, for providing a high-bandwidth, low latency SRAM for the accelerator(s) 1114. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1104 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LiDAR data for purposes of localization and/or other functions, and/or for other uses. In some embodiments, one or more tree traversal units (TTUs) may be used for executing one or more ray-tracing related operations.

The accelerator(s) 1114 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1166 output that correlates with the vehicle 1100 orientation, distance, 3D location estimates of the object obtained from the neural network and/or other sensors (e.g., LiDAR sensor(s) 1164 or RADAR sensor(s) 1160), among others.

The SoC(s) 1104 may include data store(s) 1116 (e.g., memory). The data store(s) 1116 may be on-chip memory of the SoC(s) 1104, which may store neural networks to be executed on the GPU and/or the DLA. In some examples, the data store(s) 1116 may be large enough in capacity to store multiple instances of neural networks for redundancy and safety. The data store(s) 1112 may comprise L2 or L3 cache(s) 1112. Reference to the data store(s) 1116 may include reference to the memory associated with the PVA, DLA, and/or other accelerator(s) 1114, as described herein.

The SoC(s) 1104 may include one or more processor(s) 1110 (e.g., embedded processors). The processor(s) 1110 may include a boot and power management processor that may be a dedicated processor and subsystem to handle boot power and management functions and related security enforcement. The boot and power management processor may be a part of the SoC(s) 1104 boot sequence and may provide runtime power management services. The boot power and management processor may provide clock and voltage programming, assistance in system low power state transitions, management of SoC(s) 1104 thermals and temperature sensors, and/or management of the SoC(s) 1104 power states. Each temperature sensor may be implemented as a ring-oscillator whose output frequency is proportional to temperature, and the SoC(s) 1104 may use the ring-oscillators to detect temperatures of the CPU(s) 1106, GPU(s) 1108, and/or accelerator(s) 1114. If temperatures are determined to exceed a threshold, the boot and power management processor may enter a temperature fault routine and put the SoC(s) 1104 into a lower power state and/or put the vehicle 1100 into a chauffeur to safe stop mode (e.g., bring the vehicle 1100 to a safe stop).

The processor(s) 1110 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1110 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1110 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1110 may further include a real-time camera engine that may include a dedicated processor subsystem for handling real-time camera management.

The processor(s) 1110 may further include a high-dynamic range signal processor that may include an image signal processor that is a hardware engine that is part of the camera processing pipeline.

The processor(s) 1110 may include a video image compositor that may be a processing block (e.g., implemented on a microprocessor) that implements video post-processing functions needed by a video playback application to produce the final image for the player window. The video image compositor may perform lens distortion correction on wide-view camera(s) 1170, surround camera(s) 1174, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1108 is not required to continuously render new surfaces. Even when the GPU(s) 1108 is powered on and active doing 3D rendering, the video image compositor may be used to offload the GPU(s) 1108 to improve performance and responsiveness.

The SoC(s) 1104 may further include a mobile industry processor interface (MIPI) camera serial interface for receiving video and input from cameras, a high-speed interface, and/or a video input block that may be used for camera and related pixel input functions. The SoC(s) 1104 may further include an input/output controller(s) that may be controlled by software and may be used for receiving I/O signals that are uncommitted to a specific role.

The SoC(s) 1104 may further include a broad range of peripheral interfaces to enable communication with peripherals, audio codecs, power management, and/or other devices. The SoC(s) 1104 may be used to process data from cameras (e.g., connected over Gigabit Multimedia Serial Link and Ethernet), sensors (e.g., LiDAR sensor(s) 1164, RADAR sensor(s) 1160, etc. that may be connected over Ethernet), data from bus 1102 (e.g., speed of vehicle 1100, steering wheel position, etc.), data from GNSS sensor(s) 1158 (e.g., connected over Ethernet or CAN bus). The SoC(s) 1104 may further include dedicated high-performance mass storage controllers that may include their own DMA engines, and that may be used to free the CPU(s) 1106 from routine data management tasks.

The SoC(s) 1104 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1104 may be faster, more reliable, and even more energy-efficient and space-efficient than conventional systems. For example, the accelerator(s) 1114, when combined with the CPU(s) 1106, the GPU(s) 1108, and the data store(s) 1116, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1120) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving.

For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1108.

In some examples, a CNN for facial recognition and vehicle owner identification may use data from camera sensors to identify the presence of an authorized driver and/or owner of the vehicle 1100. The always on sensor processing engine may be used to unlock the vehicle when the owner approaches the driver door and turn on the lights, and, in security mode, to disable the vehicle when the owner leaves the vehicle. In this way, the SoC(s) 1104 provide for security against theft and/or carjacking.

In another example, a CNN for emergency vehicle detection and identification may use data from microphones 1196 to detect and identify emergency vehicle sirens. In contrast to conventional systems, that use general classifiers to detect sirens and manually extract features, the SoC(s) 1104 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1158. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1162, until the emergency vehicle(s) passes.

The vehicle may include a CPU(s) 1118 (e.g., discrete CPU(s), or dCPU(s)), that may be coupled to the SoC(s) 1104 via a high-speed interconnect (e.g., PCIe). The CPU(s) 1118 may include an X86 processor, for example. The CPU(s) 1118 may be used to perform any of a variety of functions, including arbitrating potentially inconsistent results between ADAS sensors and the SoC(s) 1104, and/or monitoring the status and health of the controller(s) 1136 and/or infotainment SoC 1130, for example.

The vehicle 1100 may include a GPU(s) 1120 (e.g., discrete GPU(s), or dGPU(s)), that may be coupled to the SoC(s) 1104 via a high-speed interconnect (e.g., NVIDIA's NVLINK). The GPU(s) 1120 may provide additional artificial intelligence functionality, such as by executing redundant and/or different neural networks, and may be used to train and/or update neural networks based on input (e.g., sensor data) from sensors of the vehicle 1100.

The vehicle 1100 may further include the network interface 1124 which may include one or more wireless antennas 1126 (e.g., one or more wireless antennas for different communication protocols, such as a cellular antenna, a Bluetooth antenna, etc.). The network interface 1124 may be used to enable wireless connectivity over the Internet with the cloud (e.g., with the server(s) 1178 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1100 information about vehicles in proximity to the vehicle 1100 (e.g., vehicles in front of, on the side of, and/or behind the vehicle 1100). This functionality may be part of a cooperative adaptive cruise control functionality of the vehicle 1100.

The network interface 1124 may include a SoC that provides modulation and demodulation functionality and enables the controller(s) 1136 to communicate over wireless networks. The network interface 1124 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1100 may further include data store(s) 1128 which may include off-chip (e.g., off the SoC(s) 1104) storage. The data store(s) 1128 may include one or more storage elements including RAM, SRAM, DRAM, VRAM, Flash, hard disks, and/or other components and/or devices that may store at least one bit of data.

The vehicle 1100 may further include GNSS sensor(s) 1158. The GNSS sensor(s) 1158 (e.g., GPS, assisted GPS sensors, differential GPS (DGPS) sensors, etc.), to assist in mapping, perception, occupancy grid generation, and/or path planning functions. Any number of GNSS sensor(s) 1158 may be used, including, for example and without limitation, a GPS using a USB connector with an Ethernet to Serial (RS-232) bridge.

The vehicle 1100 may further include RADAR sensor(s) 1160. The RADAR sensor(s) 1160 may be used by the vehicle 1100 for long-range vehicle detection, even in darkness and/or severe weather conditions. RADAR functional safety levels may be ASIL B. The RADAR sensor(s) 1160 may use the CAN and/or the bus 1102 (e.g., to transmit data generated by the RADAR sensor(s) 1160) for control and to access object tracking data, with access to Ethernet to access raw data in some examples. A wide variety of RADAR sensor types may be used. For example, and without limitation, the RADAR sensor(s) 1160 may be suitable for front, rear, and side RADAR use. In some example, Pulse Doppler RADAR sensor(s) are used.

The RADAR sensor(s) 1160 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1160 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1100 surroundings at higher speeds with minimal interference from traffic in adjacent lanes. The other two antennae may expand the field of view, making it possible to quickly detect vehicles entering or leaving the vehicle's 1100 lane.

Mid-range RADAR systems may include, as an example, a range of up to 1160 m (front) or 80 m (rear), and a field of view of up to 42 degrees (front) or 1150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1100 may further include ultrasonic sensor(s) 1162. The ultrasonic sensor(s) 1162, which may be positioned at the front, back, and/or the sides of the vehicle 1100, may be used for park assist and/or to create and update an occupancy grid. A wide variety of ultrasonic sensor(s) 1162 may be used, and different ultrasonic sensor(s) 1162 may be used for different ranges of detection (e.g., 2.5 m, 4 m). The ultrasonic sensor(s) 1162 may operate at functional safety levels of ASIL B.

The vehicle 1100 may include LiDAR sensor(s) 1164. The LiDAR sensor(s) 1164 may be used for object and pedestrian detection, emergency braking, collision avoidance, and/or other functions. The LiDAR sensor(s) 1164 may be functional safety level ASIL B. In some examples, the vehicle 1100 may include multiple LiDAR sensors 1164 (e.g., two, four, six, etc.) that may use Ethernet (e.g., to provide data to a Gigabit Ethernet switch).

In some examples, the LiDAR sensor(s) 1164 may be capable of providing a list of objects and their distances for a 360-degree field of view. Commercially available LiDAR sensor(s) 1164 may have an advertised range of approximately 1100 m, with an accuracy of 2 cm-3 cm, and with support for a 1100 Mbps Ethernet connection, for example. In some examples, one or more non-protruding LiDAR sensors 1164 may be used. In such examples, the LiDAR sensor(s) 1164 may be implemented as a small device that may be embedded into the front, rear, sides, and/or corners of the vehicle 1100. The LiDAR sensor(s) 1164, in such examples, may provide up to a 120-degree horizontal and 35-degree vertical field-of-view, with a 200 m range even for low-reflectivity objects. Front-mounted LiDAR sensor(s) 1164 may be configured for a horizontal field of view between 45 degrees and 135 degrees.

In some examples, LiDAR technologies, such as 3D flash LiDAR, may also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR may allow for highly accurate and distortion-free images of the surroundings to be generated with every laser flash. In some examples, four flash LiDAR sensors may be deployed, one at each side of the vehicle 1100. Available 3D flash LiDAR systems include a solid-state 3D staring array LiDAR camera with no moving parts other than a fan (e.g., a non-scanning LiDAR device). The flash LiDAR device may use a 5 nanosecond class I (eye-safe) laser pulse per frame and may capture the reflected laser light in the form of 3D range point clouds and co-registered intensity data. By using flash LiDAR, and because flash LiDAR is a solid-state device with no moving parts, the LiDAR sensor(s) 1164 may be less susceptible to motion blur, vibration, and/or shock.

The vehicle may further include IMU sensor(s) 1166. The IMU sensor(s) 1166 may be located at a center of the rear axle of the vehicle 1100, in some examples. The IMU sensor(s) 1166 may include, for example and without limitation, an accelerometer(s), a magnetometer(s), a gyroscope(s), a magnetic compass(es), and/or other sensor types. In some examples, such as in six-axis applications, the IMU sensor(s) 1166 may include accelerometers and gyroscopes, while in nine-axis applications, the IMU sensor(s) 1166 may include accelerometers, gyroscopes, and magnetometers.

In some embodiments, the IMU sensor(s) 1166 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1166 may enable the vehicle 1100 to estimate heading without requiring input from a magnetic sensor by directly observing and correlating the changes in velocity from GPS to the IMU sensor(s) 1166. In some examples, the IMU sensor(s) 1166 and the GNSS sensor(s) 1158 may be combined in a single integrated unit.

The vehicle may include microphone(s) 1196 placed in and/or around the vehicle 1100. The microphone(s) 1196 may be used for emergency vehicle detection and identification, among other things.

The vehicle may further include any number of camera types, including stereo camera(s) 1168, wide-view camera(s) 1170, infrared camera(s) 1172, surround camera(s) 1174, long-range and/or mid-range camera(s) 1198, and/or other camera types. The cameras may be used to capture image data around an entire periphery of the vehicle 1100. The types of cameras used depends on the embodiments and requirements for the vehicle 1100, and any combination of camera types may be used to provide the necessary coverage around the vehicle 1100. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 11A and FIG. 11B.

The vehicle 1100 may further include vibration sensor(s) 1142. The vibration sensor(s) 1142 may measure vibrations of components of the vehicle, such as the axle(s). For example, changes in vibrations may indicate a change in road surfaces. In another example, when two or more vibration sensors 1142 are used, the differences between the vibrations may be used to determine friction or slippage of the road surface (e.g., when the difference in vibration is between a power-driven axle and a freely rotating axle).

The vehicle 1100 may include an ADAS system 1138. The ADAS system 1138 may include a SoC, in some examples. The ADAS system 1138 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1160, LiDAR sensor(s) 1164, and/or a camera(s). The ACC systems may include longitudinal ACC and/or lateral ACC. Longitudinal ACC monitors and controls the distance to the vehicle immediately ahead of the vehicle 1100 and automatically adjust the vehicle speed to maintain a safe distance from vehicles ahead. Lateral ACC performs distance keeping, and advises the vehicle 1100 to change lanes when necessary. Lateral ACC is related to other ADAS applications such as LCA and CWS.

CACC uses information from other vehicles that may be received via the network interface 1124 and/or the wireless antenna(s) 1126 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1100), while the I2V communication concept provides information about traffic further ahead. CACC systems may include either or both I2V and V2V information sources. Given the information of the vehicles ahead of the vehicle 1100, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1160, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1160, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1100 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1100 if the vehicle 1100 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1160, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1100 is backing up. Some RCTW systems include AEB to ensure that the vehicle brakes are applied to avoid a crash. RCTW systems may use one or more rear-facing RADAR sensor(s) 1160, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1100, the vehicle 1100 itself must, in the case of conflicting results, decide whether to heed the result from a primary computer or a secondary computer (e.g., a first controller 1136 or a second controller 1136). For example, in some embodiments, the ADAS system 1138 may be a backup and/or secondary computer for providing perception information to a backup computer rationality module. The backup computer rationality monitor may run a redundant diverse software on hardware components to detect faults in perception and dynamic driving tasks. Outputs from the ADAS system 1138 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1104.

In other examples, ADAS system 1138 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1138 may be fed into the primary computer's perception block and/or the primary computer's dynamic driving task block. For example, if the ADAS system 1138 indicates a forward crash warning due to an object immediately ahead, the perception block may use this information when identifying objects. In other examples, the secondary computer may have its own neural network which is trained and thus reduces the risk of false positives, as described herein.

The vehicle 1100 may further include the infotainment SoC 1130 (e.g., an in-vehicle infotainment system (IVI)). Although illustrated and described as a SoC, the infotainment system may not be a SoC, and may include two or more discrete components. The infotainment SoC 1130 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1100. For example, the infotainment SoC 1130 may radios, disk players, navigation systems, video players, USB and Bluetooth connectivity, carputers, in-car entertainment, Wi-Fi, steering wheel audio controls, hands free voice control, a heads-up display (HUD), an HMI display 1134, a telematics device, a control panel (e.g., for controlling and/or interacting with various components, features, and/or systems), and/or other components. The infotainment SoC 1130 may further be used to provide information (e.g., visual and/or audible) to a user(s) of the vehicle, such as information from the ADAS system 1138, autonomous driving information such as planned vehicle maneuvers, trajectories, surrounding environment information (e.g., intersection information, vehicle information, road information, etc.), and/or other information.

The infotainment SoC 1130 may include GPU functionality. The infotainment SoC 1130 may communicate over the bus 1102 (e.g., CAN bus, Ethernet, etc.) with other devices, systems, and/or components of the vehicle 1100. In some examples, the infotainment SoC 1130 may be coupled to a supervisory MCU such that the GPU of the infotainment system may perform some self-driving functions in the event that the primary controller(s) 1136 (e.g., the primary and/or backup computers of the vehicle 1100) fail. In such an example, the infotainment SoC 1130 may put the vehicle 1100 into a chauffeur to safe stop mode, as described herein.

The vehicle 1100 may further include an instrument cluster 1132 (e.g., a digital dash, an electronic instrument cluster, a digital instrument panel, etc.). The instrument cluster 1132 may include a controller and/or supercomputer (e.g., a discrete controller or supercomputer). The instrument cluster 1132 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1130 and the instrument cluster 1132. In other words, the instrument cluster 1132 may be included as part of the infotainment SoC 1130, or vice versa.

Figure 11D:
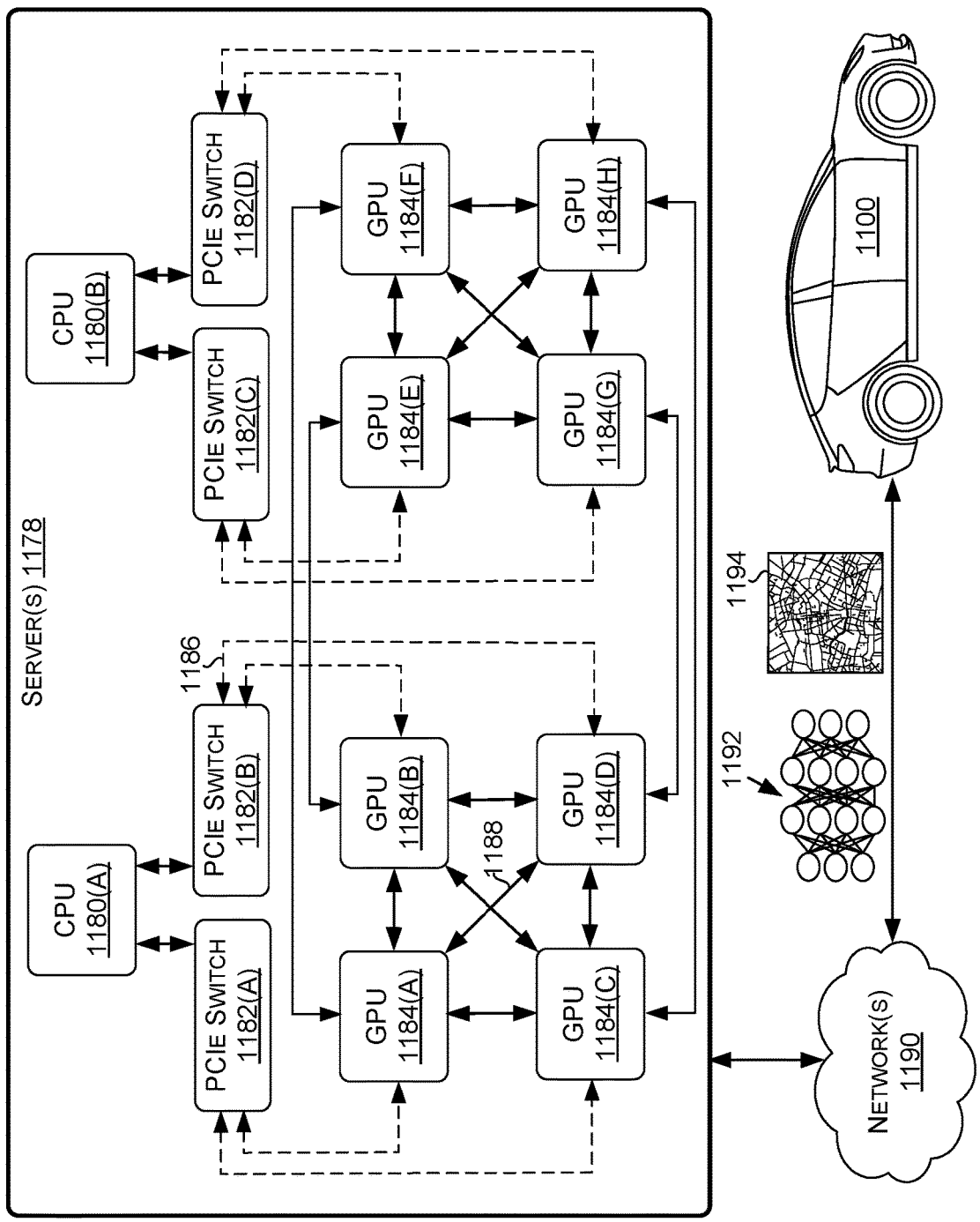
FIG. 11D is a system diagram for communication between cloud-based server(s) and the example autonomous vehicle of FIG. 11A, in accordance with some embodiments of the present disclosure.

FIG. 11D is a system diagram for communication between cloud-based server(s) and the example autonomous vehicle 1100 of FIG. 11A, in accordance with some embodiments of the present disclosure. The system 1176 may include server(s) 1178, network(s) 1190, and vehicles, including the vehicle 1100. The server(s) 1178 may include a plurality of GPUs 1184(A)-1184(H) (collectively referred to herein as GPUs 1184), PCIe switches 1182(A)-1182(H) (collectively referred to herein as PCIe switches 1182), and/or CPUs 1180(A)-1180(B) (collectively referred to herein as CPUs 1180). The GPUs 1184, the CPUs 1180, and the PCIe switches may be interconnected with high-speed interconnects such as, for example and without limitation, NVLink interfaces 1188 developed by NVIDIA and/or PCIe connections 1186. In some examples, the GPUs 1184 are connected via NVLink and/or NVSwitch SoC and the GPUs 1184 and the PCIe switches 1182 are connected via PCIe interconnects. Although eight GPUs 1184, two CPUs 1180, and two PCIe switches are illustrated, this is not intended to be limiting. Depending on the embodiment, each of the server(s) 1178 may include any number of GPUs 1184, CPUs 1180, and/or PCIe switches. For example, the server(s) 1178 may each include eight, sixteen, thirty-two, and/or more GPUs 1184.

The server(s) 1178 may receive, over the network(s) 1190 and from the vehicles, image data representative of images showing unexpected or changed road conditions, such as recently commenced road-work. The server(s) 1178 may transmit, over the network(s) 1190 and to the vehicles, neural networks 1192, updated neural networks 1192, and/or map information 1194, including information regarding traffic and road conditions. The updates to the map information 1194 may include updates for the HD map 1122, such as information regarding construction sites, potholes, detours, flooding, and/or other obstructions. In some examples, the neural networks 1192, the updated neural networks 1192, and/or the map information 1194 may have resulted from new training and/or experiences represented in data received from any number of vehicles in the environment, and/or based on training performed at a datacenter (e.g., using the server(s) 1178 and/or other servers).

The server(s) 1178 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1190, and/or the machine learning models may be used by the server(s) 1178 to remotely monitor the vehicles.

In some examples, the server(s) 1178 may receive data from the vehicles and apply the data to up-to-date real-time neural networks for real-time intelligent inferencing. The server(s) 1178 may include deep-learning supercomputers and/or dedicated AI computers powered by GPU(s) 1184, such as a DGX and DGX Station machines developed by NVIDIA. However, in some examples, the server(s) 1178 may include deep learning infrastructure that use only CPU-powered datacenters.

The deep-learning infrastructure of the server(s) 1178 may be capable of fast, real-time inferencing, and may use that capability to evaluate and verify the health of the processors, software, and/or associated hardware in the vehicle 1100. For example, the deep-learning infrastructure may receive periodic updates from the vehicle 1100, such as a sequence of images and/or objects that the vehicle 1100 has located in that sequence of images (e.g., via computer vision and/or other machine learning object classification techniques). The deep-learning infrastructure may run its own neural network to identify the objects and compare them with the objects identified by the vehicle 1100 and, if the results do not match and the infrastructure concludes that the AI in the vehicle 1100 is malfunctioning, the server(s) 1178 may transmit a signal to the vehicle 1100 instructing a fail-safe computer of the vehicle 1100 to assume control, notify the passengers, and complete a safe parking maneuver.

For inferencing, the server(s) 1178 may include the GPU(s) 1184 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 12:
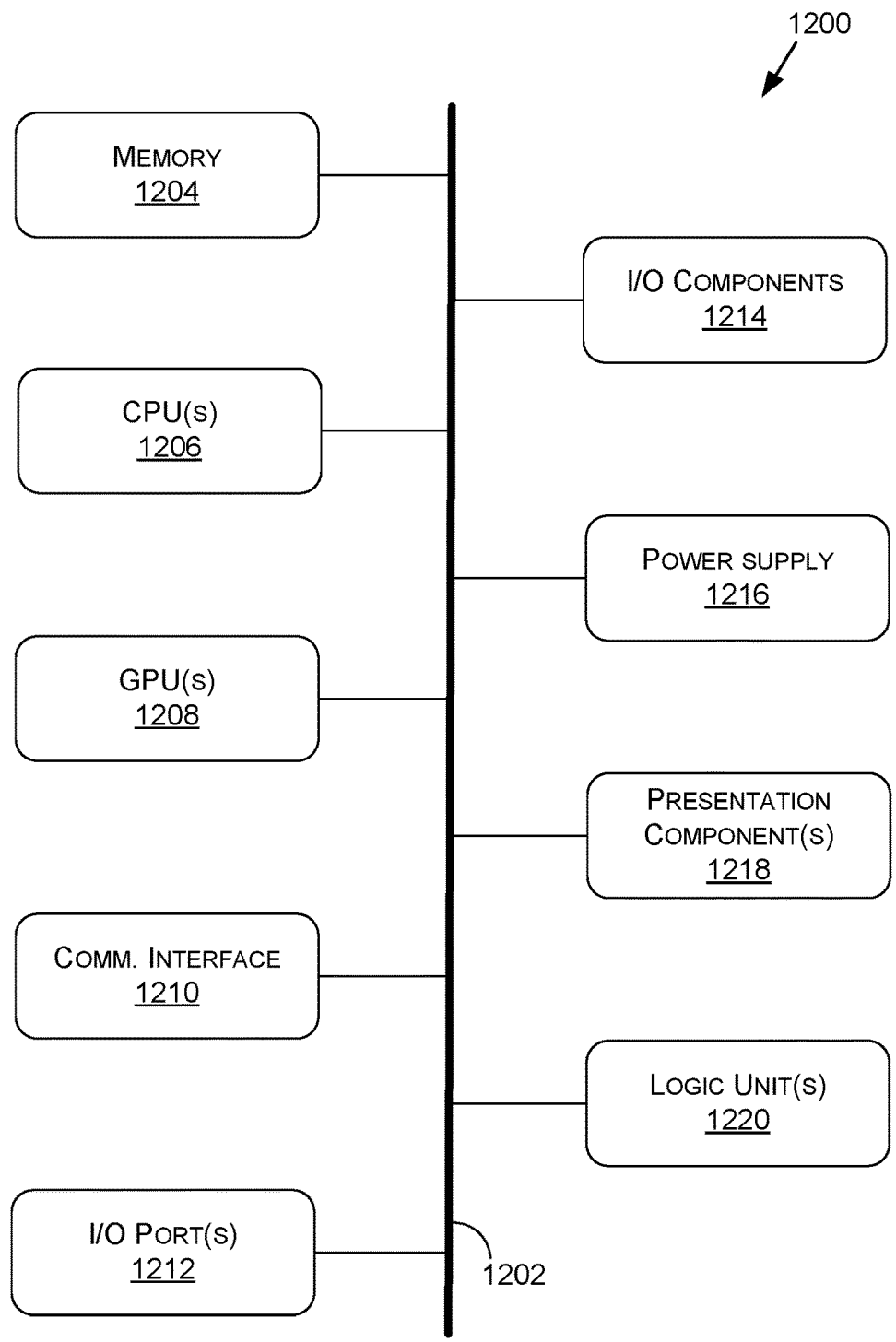
FIG. 12 is a block diagram of an example computing device suitable for use in implementing some embodiments of the present disclosure.

FIG. 12 is a block diagram of an example computing device(s) 1200 suitable for use in implementing some embodiments of the present disclosure. Computing device 1200 may include an interconnect system 1202 that directly or indirectly couples the following devices: memory 1204, one or more central processing units (CPUs) 1206, one or more graphics processing units (GPUs) 1208, a communication interface 1210, input/output (I/O) ports 1212, input/output components 1214, a power supply 1216, one or more presentation components 1218 (e.g., display(s)), and one or more logic units 1220. In at least one embodiment, the computing device(s) 1200 may comprise one or more virtual machines (VMs), and/or any of the components thereof may comprise virtual components (e.g., virtual hardware components). For non-limiting examples, one or more of the GPUs 1208 may comprise one or more vGPUs, one or more of the CPUs 1206 may comprise one or more vCPUs, and/or one or more of the logic units 1220 may comprise one or more virtual logic units. As such, a computing device(s) 1200 may include discrete components (e.g., a full GPU dedicated to the computing device 1200), virtual components (e.g., a portion of a GPU dedicated to the computing device 1200), or a combination thereof.

Although the various blocks of FIG. 12 are shown as connected via the interconnect system 1202 with lines, this is not intended to be limiting and is for clarity only. For example, in some embodiments, a presentation component 1218, such as a display device, may be considered an I/O component 1214 (e.g., if the display is a touch screen). As another example, the CPUs 1206 and/or GPUs 1208 may include memory (e.g., the memory 1204 may be representative of a storage device in addition to the memory of the GPUs 1208, the CPUs 1206, and/or other components). In other words, the computing device of FIG. 12 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 12.

The interconnect system 1202 may represent one or more links or busses, such as an address bus, a data bus, a control bus, or a combination thereof. The interconnect system 1202 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1206 may be directly connected to the memory 1204. Further, the CPU 1206 may be directly connected to the GPU 1208. Where there is direct, or point-to-point connection between components, the interconnect system 1202 may include a PCIe link to carry out the connection. In these examples, a PCI bus need not be included in the computing device 1200.

The memory 1204 may include any of a variety of computer-readable media. The computer-readable media may be any available media that may be accessed by the computing device 1200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1204 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1200. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1206 may be configured to execute at least some of the computer-readable instructions to control one or more components of the computing device 1200 to perform one or more of the methods and/or processes described herein. The CPU(s) 1206 may each include one or more cores (e.g., one, two, four, eight, twenty-eight, seventy-two, etc.) that are capable of handling a multitude of software threads simultaneously. The CPU(s) 1206 may include any type of processor, and may include different types of processors depending on the type of computing device 1200 implemented (e.g., processors with fewer cores for mobile devices and processors with more cores for servers). For example, depending on the type of computing device 1200, the processor may be an Advanced RISC Machines (ARM) processor implemented using Reduced Instruction Set Computing (RISC) or an x86 processor implemented using Complex Instruction Set Computing (CISC). The computing device 1200 may include one or more CPUs 1206 in addition to one or more microprocessors or supplementary co-processors, such as math co-processors.

In addition to or alternatively from the CPU(s) 1206, the GPU(s) 1208 may be configured to execute at least some of the computer-readable instructions to control one or more components of the computing device 1200 to perform one or more of the methods and/or processes described herein. One or more of the GPU(s) 1208 may be an integrated GPU (e.g., with one or more of the CPU(s) 1206 and/or one or more of the GPU(s) 1208 may be a discrete GPU. In embodiments, one or more of the GPU(s) 1208 may be a coprocessor of one or more of the CPU(s) 1206. The GPU(s) 1208 may be used by the computing device 1200 to render graphics (e.g., 3D graphics) or perform general purpose computations. For example, the GPU(s) 1208 may be used for General-Purpose computing on GPUs (GPGPU). The GPU(s) 1208 may include hundreds or thousands of cores that are capable of handling hundreds or thousands of software threads simultaneously. The GPU(s) 1208 may generate pixel data for output images in response to rendering commands (e.g., rendering commands from the CPU(s) 1206 received via a host interface). The GPU(s) 1208 may include graphics memory, such as display memory, for storing pixel data or any other suitable data, such as GPGPU data. The display memory may be included as part of the memory 1204. The GPU(s) 1208 may include two or more GPUs operating in parallel (e.g., via a link). The link may directly connect the GPUs (e.g., using NVLINK) or may connect the GPUs through a switch (e.g., using NVSwitch). When combined together, each GPU 1208 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1206 and/or the GPU(s) 1208, the logic unit(s) 1220 may be configured to execute at least some of the computer-readable instructions to control one or more components of the computing device 1200 to perform one or more of the methods and/or processes described herein. In embodiments, the CPU(s) 1206, the GPU(s) 1208, and/or the logic unit(s) 1220 may discretely or jointly perform any combination of the methods, processes and/or portions thereof. One or more of the logic units 1220 may be part of and/or integrated in one or more of the CPU(s) 1206 and/or the GPU(s) 1208 and/or one or more of the logic units 1220 may be discrete components or otherwise external to the CPU(s) 1206 and/or the GPU(s) 1208. In embodiments, one or more of the logic units 1220 may be a coprocessor of one or more of the CPU(s) 1206 and/or one or more of the GPU(s) 1208.

Examples of the logic unit(s) 1220 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1210 may include one or more receivers, transmitters, and/or transceivers that enable the computing device 1200 to communicate with other computing devices via an electronic communication network, included wired and/or wireless communications. The communication interface 1210 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1220 and/or communication interface 1210 may include one or more data processing units (DPUs) to transmit data received over a network and/or through interconnect system 1202 directly to (e.g., a memory of) one or more GPU(s) 1208.

The I/O ports 1212 may enable the computing device 1200 to be logically coupled to other devices including the I/O components 1214, the presentation component(s) 1218, and/or other components, some of which may be built in to (e.g., integrated in) the computing device 1200. Illustrative I/O components 1214 include a microphone, mouse, keyboard, joystick, game pad, game controller, satellite dish, scanner, printer, wireless device, etc. The I/O components 1214 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device

1200. The computing device 1200 may be include depth cameras, such as stereoscopic camera systems, infrared camera systems, RGB camera systems, touchscreen technology, and combinations of these, for gesture detection and recognition. Additionally, the computing device 1200 may include accelerometers or gyroscopes (e.g., as part of an inertia measurement unit (IMU)) that enable detection of motion. In some examples, the output of the accelerometers or gyroscopes may be used by the computing device 1200 to render immersive augmented reality or virtual reality.

The power supply 1216 may include a hard-wired power supply, a battery power supply, or a combination thereof. The power supply 1216 may provide power to the computing device 1200 to enable the components of the computing device 1200 to operate.

The presentation component(s) 1218 may include a display (e.g., a monitor, a touch screen, a television screen, a heads-up-display (HUD), other display types, or a combination thereof), speakers, and/or other presentation components. The presentation component(s) 1218 may receive data from other components (e.g., the GPU(s) 1208, the CPU(s) 1206, DPUs, etc.), and output the data (e.g., as an image, video, sound, etc.).

Example Data Center

Figure 13:
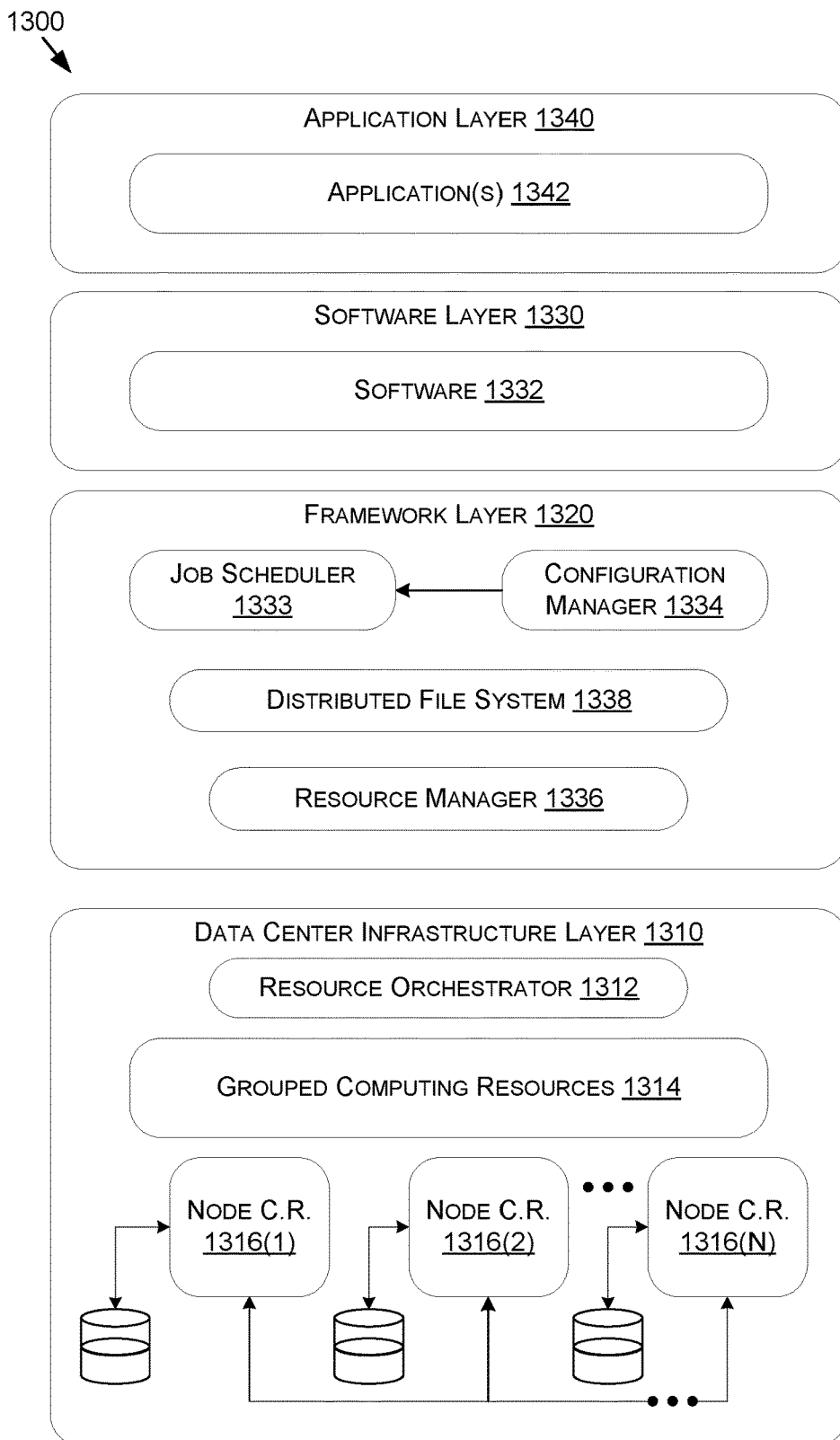
FIG. 13 is a block diagram of an example data center suitable for use in implementing some embodiments of the present disclosure.

FIG. 13 illustrates an example data center 1300 that may be used in at least one embodiments of the present disclosure. The data center 1300 may include a data center infrastructure layer 1310, a framework layer 1320, a software layer 1330, and/or an application layer 1340.

As shown in FIG. 13, the data center infrastructure layer 1310 may include a resource orchestrator 1312, grouped computing resources 1314, and node computing resources ("node C.R.s") 1316(1)-1316(N), where "N" represents any whole, positive integer. In at least one embodiment, node C.R.s 1316(1)-1316(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1316(1)-1316(N) may correspond to a server having one or more of the above-mentioned computing resources. In addition, in some embodiments, the node C.R.s 1316(1)-13161(N) may include one or more virtual components, such as vGPUs, vCPUs, and/or the like, and/or one or more of the node C.R.s 1316(1)-1316(N) may correspond to a virtual machine (VM).

In at least one embodiment, grouped computing resources 1314 may include separate groupings of node C.R.s 1316 housed within one or more racks (not shown), or many racks housed in data centers at various geographical locations (also not shown). Separate groupings of node C.R.s 1316 within grouped computing resources 1314 may include grouped compute, network, memory or storage resources that may be configured or allocated to support one or more workloads. In at least one embodiment, several node C.R.s 1316 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1312 may configure or otherwise control one or more node C.R.s 1316(1)-1316(N) and/or grouped computing resources 1314. In at least one embodiment, resource orchestrator 1312 may include a software design infrastructure (SDI) management entity for the data center 1300. The resource orchestrator 1312 may include hardware, software, or some combination thereof.

In at least one embodiment, as shown in FIG. 13, framework layer 1320 may include a job scheduler 1333, a configuration manager 1334, a resource manager 1336, and/or a distributed file system 1338. The framework layer 1320 may include a framework to support software 1332 of software layer 1330 and/or one or more application(s) 1342 of application layer 1340. The software 1332 or application(s) 1342 may respectively include web-based service software or applications, such as those provided by Amazon Web Services, Google Cloud and Microsoft Azure. The framework layer 1320 may be, but is not limited to, a type of free and open-source software web application framework such as Apache Spark™ (hereinafter "Spark") that may utilize distributed file system 1338 for large-scale data processing (e.g., "big data"). In at least one embodiment, job scheduler 1333 may include a Spark driver to facilitate scheduling of workloads supported by various layers of data center 1300. The configuration manager 1334 may be capable of configuring different layers such as software layer 1330 and framework layer 1320 including Spark and distributed file system 1338 for supporting large-scale data processing. The resource manager 1336 may be capable of managing clustered or grouped computing resources mapped to or allocated for support of distributed file system 1338 and job scheduler 1333. In at least one embodiment, clustered or grouped computing resources may include grouped computing resource 1314 at data center infrastructure layer 1310. The resource manager 1336 may coordinate with resource orchestrator 1312 to manage these mapped or allocated computing resources.

In at least one embodiment, software 1332 included in software layer 1330 may include software used by at least portions of node C.R.s 1316(1)-1316(N), grouped computing resources 1314, and/or distributed file system 1338 of framework layer 1320. One or more types of software may include, but are not limited to, Internet web page search software, e-mail virus scan software, database software, and streaming video content software.

In at least one embodiment, application(s) 1342 included in application layer 1340 may include one or more types of applications used by at least portions of node C.R.s 1316(1)-1316(N), grouped computing resources 1314, and/or distributed file system 1338 of framework layer 1320. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1334, resource manager 1336, and resource orchestrator 1312 may implement any number and type of self-modifying actions based on any amount and type of data acquired in any technically feasible fashion. Self-modifying actions may relieve a data center operator of data center 1300 from making possibly bad configuration decisions and possibly avoiding underutilized and/or poor performing portions of a data center.

The data center 1300 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1300. In at least one embodiment, trained or deployed machine learning models corresponding to one or more neural networks may be used to infer or predict information using resources described above with respect to the data center 1300 by using weight parameters calculated through one or more training techniques, such as but not limited to those described herein.

In at least one embodiment, the data center 1300 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1200 of FIG. 12—e.g., each device may include similar components, features, and/or functionality of the computing device(s) 1200. In addition, where backend devices (e.g., servers, NAS, etc.) are implemented, the backend devices may be included as part of a data center 1300, an example of which is described in more detail herein with respect to FIG. 13.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1200 described herein with respect to FIG. 12. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positi[o-p-ning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   determining that a first image point of a first image represented by first image data obtained using a first image sensor of a machine tracks to a second image point of a second image represented by second image data obtained using a second image sensor of the machine;
   generating, based at least on LiDAR data obtained using a LiDAR sensor of the machine, a point cloud;
   determining that the first image point of the first image and a third image point of the second image correspond to a LiDAR point of the point cloud; and
   determining, based at least on a distance between the second image point of the second image and the third image point of the second image, one or more values of one or more parameters for calibrating the first image sensor with respect to the second image sensor.

2. The method of claim 1, further comprising:
   determining, based at least on the one or more values of the one or more parameters, that the first image point of the first image and a fourth image point of the second image correspond to a second LiDAR point of the point cloud; and
   determining, based at least on the second image point of the second image and the fourth image point of the second image, one or more second values of the one or more parameters for calibrating the first image sensor with respect to the second image sensor.

3. The method of claim 1, wherein the determining that the first image point of the first image tracks to the second image point of the second image comprises:
   generating, based at least on the first image data, a second point cloud;
   generating, based at least on the second image data, a third point cloud; and
   determining, based at least on aligning the second point cloud with respect to the third point cloud, that the first image point of the first image tracks to the second image point of the second image.

4. The method of claim 1, further comprising:
   determining one or more second values of the one or more parameters for calibrating the first image sensor with respect to the LiDAR sensor; and
   determining one or more third values of the one or more parameters for calibrating the second image sensor with respect to the LiDAR sensor,
   wherein the determining that the first image point of the first image tracks to the second image point of the second image is further based at least on the one or more second values of the one or more parameters and the one or more third values of the one or more parameters.

5. The method of claim 3, wherein the determining that the first image point of the first image tracks to the second image point of the second image comprises:
   determining, based at least on the aligning of the second point cloud with respect to the third point cloud, the first image point of the first image;
   determining, based at least on the aligning of the second point cloud with respect to the third point cloud, a fourth image point of the second image;
   determining a translation associated with the first image and the second image; and
   determining, based at least on the translation and the fourth image point of the second image, the second image point of the second image that tracks to the first image point of the first image.

6. The method of claim 1, wherein the determining that the first image point of the first image and the third image point of the second image correspond to the LiDAR point of the point cloud comprises:
   projecting, based at least on one or more initial parameters associated with the first image sensor, a first ray from the first image point of the first image to the LiDAR point of the point cloud; and
   projecting a second ray from the LiDAR point of the point cloud to the third image point of the second image.

7. The method of claim 1, wherein the one or more values of the one or more parameters include at least one of:
   one or more translation values for aligning the first image sensor with respect to the second image sensor;
   one or more rotation values for aligning the first image sensor with respect to the second image sensor; or
   one or more lens parameter values for aligning the first image sensor with respect to the second image sensor.

8. A system comprising:
   one or more processors to:
      generate a first point cloud associated with first image data obtained using a first image sensor of a machine and a second point cloud associated with second image data obtained using a second image sensor of the machine;
      determine, based at least on aligning the first point cloud with respect to the second point cloud, that a first image point of a first image represented by the first image data tracks to a second image point of a second image represented by the second image data;
      generate, based at least on LiDAR data obtained using a LiDAR sensor of the machine, a third point cloud;
      determine that the first image point of the first image and a third image point of the second image correspond to a LiDAR point of the third point cloud; and
      determine, based at least on the second image point of the second image and the third image point of the second image, one or more values of one or more parameters for calibrating the first image sensor with respect to the second image sensor.

9. The system of claim 8, wherein the one or more processors are further to:
   determine, based at least on the one or more values of the one or more parameters, that the first image point of the first image and a fourth image point of the second image correspond to a second LiDAR point of the point cloud; and determine, based at least on the second image point of the second image and the fourth image point of the second image, one or more second values of the one or more parameters for calibrating the first image sensor with respect to the second image sensor.

10. The system of claim 8, wherein the determination that the one or more values of the one or more parameters for calibrating the first image sensor with respect to the second image sensor comprises:

determining a distance between the second image point of the second image and the third image point of the second image; and determining, based at least on the distance, the one or more values of the one or more parameters for calibrating the first image sensor with respect to the second image sensor.

11. The system of claim 3, wherein the determination that the first image point of the first image tracks to the second image point of the second image comprises:

determining, based at least on the aligning of the first point cloud with respect to the second point cloud, the first image point of the first image;

determining, based at least on the aligning of the first point cloud with respect to the second point cloud, a fourth image point of the second image;

determining a translation associated with the first image and the second image; and determining, based at least on the translation and the fourth image point of the second image, the second image point of the second image that tracks to the first image point of the first image.

12. The system of claim 8, wherein the one or more processors are further to:

determine one or more second values of the one or more parameters for calibrating the first image sensor with respect to the LiDAR sensor; and determine one or more third values of the one or more parameters for calibrating the second image sensor with respect to the LiDAR sensor, wherein the determination that the first image point of the first image tracks to the second image point of the second image is further based at least on the one or more second values of the one or more parameters and the one or more third values of the one or more parameters.

13. The system of claim 8, wherein the determination that the first image point of the first image and the third image point of the second image correspond to the LiDAR point of the third point cloud comprises:

projecting, based at least on one or more initial parameters associated with the first image sensor, a first ray from the first image point of the first image to the LiDAR point of the third point cloud; and projecting a second ray from the LiDAR point of the point cloud to the third image point of the second image.

14. The system of claim 8, wherein the one or more values of the one or more parameters include at least one of:

one or more translation values for aligning the first image sensor with respect to the second image sensor;

one or more rotation values for aligning the first image sensor with respect to the second image sensor; or one or more lens parameter values for aligning the first image sensor with respect to the second image sensor.

15. The system of claim 8, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

16. A processor comprising:

processing circuitry to:

determine that a first image point of a first image represented by first image data obtained using a first image sensor of a machine tracks to a second image point of a second image represented by second image data obtained using a second image sensor of the machine;

generate, based at least on LiDAR data obtained using a LiDAR sensor of the machine, a point cloud;

determine, based at least on one or more first values of one or more parameters for calibrating the first image sensor with respect to the second image sensor, that the first image point of the first image and a third image point of the second image correspond to a LiDAR point of the point cloud; and determine, based at least on the second image point of the second image and the third image point of the second image, one or more second values of the one or more parameters for calibrating the first image sensor with respect to the second image sensor.

17. The processor of claim 16, wherein the processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

18. The processor of claim 16, wherein the determination that the first image point of the first image tracks to the second image point of the second image comprises:

generating, based at least on the first image data, a second point cloud;

generating, based at least on the second image data, a third point cloud; and determining, based at least on aligning the second point cloud with respect to the third point cloud, that the first image point of the first image tracks to the second image point of the second image.

19. The processor of claim 16, wherein the processing circuitry is further to:

determine one or more third values of the one or more parameters for calibrating the first image sensor with respect to the LiDAR sensor; and determining one or more fourth values of the one or more parameters for calibrating the second image sensor with respect to the LiDAR sensor, wherein the determination that the first image point of the first image tracks to the second image point of the second image is further based at least on the one or more third values of the one or more parameters and the one or more fourth values of the one or more parameters.

20. The processor of claim 16, wherein the one or more second values of the one or more parameters include at least one of:

one or more translation values for aligning the first image sensor with respect to the second image sensor;

one or more rotation values for aligning the first image sensor with respect to the second image sensor; or one or more lens parameter values for aligning the first image sensor with respect to the second image sensor.

* * * * *